(12) United States Patent
Kim et al.

(10) Patent No.: US 7,525,623 B2
(45) Date of Patent: *Apr. 28, 2009

(54) LIQUID CRYSTAL DISPLAY

(75) Inventors: Hee-Seob Kim, Gyeonggi-do (KR); Doo-Hwan You, Suwon-si (KR); Joon-Hak Oh, Seoul (KR); Jong-Lae Kim, Seoul (KR); Sung-Kyu Hong, Seongnam-si (KR); Young-Chol Yang, Kunpo-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/777,067

(22) Filed: Jul. 12, 2007

(65) Prior Publication Data

US 2008/0018842 A1    Jan. 24, 2008

Related U.S. Application Data

(63) Continuation of application No. 10/864,494, filed on Jun. 10, 2004, now Pat. No. 7,256,849.

(30) Foreign Application Priority Data

Jun. 11, 2003  (KR) .................. 10-2003-0037595
Jun. 11, 2003  (KR) .................. 10-2003-0037604

(51) Int. Cl.
    *G02F 1/1368*    (2006.01)
    *G02F 1/139*     (2006.01)
    *G02F 1/1337*    (2006.01)

(52) U.S. Cl. .................. 349/129; 349/96; 349/124; 349/128; 349/130

(58) Field of Classification Search ............ 349/42, 349/43, 96, 99, 123, 128, 129, 130, 136, 349/139, 178; 345/87
See application file for complete search history.

(56) References Cited

U.S. PATENT DOCUMENTS

| | | |
|---|---|---|
| 6,940,573 B2 | 9/2005 | Um et al. |
| 7,158,201 B2 | 1/2007 | Kim et al. |
| 2004/0189916 A1 | 9/2004 | Song |
| 2004/0233343 A1 | 11/2004 | Baek |

*Primary Examiner*—Dung Nguyen
*Assistant Examiner*—Tai Duong
(74) *Attorney, Agent, or Firm*—Cantor Colburn LLP

(57) ABSTRACT

A liquid crystal display is provided, which includes: first and second panels facing each other, interposing a gap therebetween, and first and second field generating electrodes, respectively; a liquid crystal layer filled in the gap and including a plurality of liquid crystal molecules; first and second tilt direction defining members disposed on the first and the second panels, respectively, and giving a first tilt direction to a group of the liquid crystal molecules; and a third tilt direction defining member disposed on one of the first and the second panels and giving a second tilt direction oblique to the first tilt direction to the group of the liquid crystal molecules.

27 Claims, 23 Drawing Sheets

LIQUID CRYSTAL DISPLAY

CROSS REFERENCE TO PRIOR APPLICATIONS

This application is a continuation application of U.S. application Ser. No. 10/864,494 filed Jun. 10, 2004, now U.S. Pat. No. 7,256,849, which claims priority to Korean Patent Application No. 10-2003-0037595, filed Jun. 11, 2003, and Korean Patent Application No. 10-2003-0037604, filed Jun. 11, 2003, and all the benefits accruing therefrom under 35 U.S.C. § 119, the contents of which in their entirety are herein incorporated by reference.

BACKGROUND OF THE INVENTION

1. Field of the Invention

The present invention relates to a liquid crystal display.

2. Description of the Related Art

A liquid crystal display (LCD) is one of the most widely used flat panel displays. An LCD includes two panels provided with field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

Among the LCDs, a vertical alignment (VA) mode LCD, which aligns LC molecules such that the long axes of the LC molecules are perpendicular to the panels in absence of electric field, is spotlighted because of its high contrast ratio and wide viewing angle.

The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed into several directions by using the cutouts and the protrusions such that the viewing angle is widened.

However, the VA mode LCD has relatively poor lateral visibility compared with front visibility.

SUMMARY OF THE INVENTION

A liquid crystal display is provided, which includes: first and second panels facing each other, interposing a gap therebetween, and first and second field generating electrodes, respectively; a liquid crystal layer filled in the gap and including a plurality of liquid crystal molecules; first and second tilt direction defining members disposed on the first and the second panels, respectively, and giving a first tilt direction to a group of the liquid crystal molecules; and a third tilt direction defining member disposed on one of the first and the second panels and giving a second tilt direction oblique to the first tilt direction to the group of the liquid crystal molecules.

The second tilt direction preferably makes an angle of about 40-50 degrees with the first tilt direction, and more preferably, it makes an angle of about 45 degrees with the first tilt direction.

The liquid crystal display may further include a first polarizer disposed on the first panel and having a polarization axis substantially parallel to the second tilt direction. In this case, the third tilt direction defining member is preferably disposed on the first panel.

The liquid crystal display may further include a fourth tilt direction defining member disposed on the second panel and giving a third tilt direction opposite the second tilt direction to the second the group of the liquid crystal molecules.

The liquid crystal display may further include a second polarizer disposed on the second panel and having a polarization axis substantially perpendicular to the polarization axis of the first polarizer.

One of the first and the second panels may further include: a thin film transistor connected to one of the first and the second field-generating electrodes; and a gate line and a data line connected to the thin film transistor.

The first and the second tilt direction defining members may extend parallel to each other to define an area having two major edges and the group of the liquid crystal molecules are disposed in the area defined by the first and the second tilt direction defining members.

The first tilt direction defining member may include one of at least one first cutout in the first field-generating electrode and at least one first protrusion on the first field-generating electrode, and the first tilt direction defining member may include one of at least one second cutout in the second field-generating electrode and at least one second protrusion on the second field-generating electrode.

The third tilt direction defining member may include an alignment layer that experienced pretilt treatment.

The alignment layer may be rubbed in the second tilt direction, or exposed to linearly polarized light, or it may have a plurality of depressions.

The first panel may further include: a thin film transistor connected to the first field-generating electrode; and a gate line and a data line connected to the thin film transistor; and an insulating layer disposed under the first field-generating electrode. The third tilt direction defining member includes a plurality of trenches formed at the insulating layer and disposed in the area defined by the first and the second tilt direction defining members.

The area defined by the first and the second tilt direction defining members may have a minor edge oblique to the major edges thereof and the trenches adjacent to the minor edge may extend perpendicular to the minor edge.

The liquid crystal display may further include a first polarizer disposed on the first panel and having a polarization axis substantially parallel to the second tilt direction, and a second polarizer disposed on the second panel and having a polarization axis substantially perpendicular to the polarization axis of the first polarizer.

The liquid crystal molecules may be vertically aligned.

A liquid crystal display is provided, which includes: a first substrate having first and second surfaces; a common electrode formed on the first surface of the first substrate; a first tilt direction defining member formed on the first substrate and extending in a first direction; a first alignment layer formed on the common electrode; a first polarizer disposed on the second surface of the first substrate; a second substrate having a first surface facing the first surface of the first substrate and a second surface; a gate line formed on the first surface of the second substrate; a gate insulating layer formed on the gate line; a data line formed on the gate insulating layer; a passivation layer formed on the data line; a pixel electrode formed on the passivation layer; a second tilt direction defining member formed on the second substrate and extending in the first direction; a first alignment layer formed on the pixel electrode; a second polarizer disposed on the second surface of the second substrate; and a liquid crystal layer disposed between the first alignment layer and the second alignment layer and including a plurality of liquid crystal molecules. The first tilt direction defining member includes either at least one cutout in the common electrode or at least one protrusion on the common electrode, and the second tilt direction defining member has includes either at least one cutout in the pixel electrode or at least one protrusion on the pixel electrode. In addition, the passivation layer has a plurality of trenches extending in at least one extending direction oblique to the first direction and disposed between the first tilt direction defining member and the second tilt direction defining member, or at least one of the first and the second alignment layers has experienced pretilt treatment giving at least one pretilt direction oblique to the first direction to the liquid crystal molecules.

The at least one extending direction and the at least one pretilt direction may make an angle of about 40-50 degrees, in particular, about 45 degrees.

One of polarization axes of the first and the second polarizers may be parallel to the at least one extending direction and the at least one pretilt direction.

The polarization axes of the first and the second polarizers may be crossed.

The liquid crystal molecules may be vertically aligned.

The pixel electrode may have a plurality of depressions formed by the trenches and the alignment layer may have a plurality of depressions formed the depressions of the pixel electrode.

The trenches near an edge of the pixel electrode may extend perpendicular to the edge of the pixel electrode, and the edge of the pixel electrode may be parallel to the gate line or the data line.

The pretilt treatment may include at least one of rubbing and light illumination.

Both the first and the second alignment layer may have experienced the pretilt treatment giving opposite pretilt directions.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
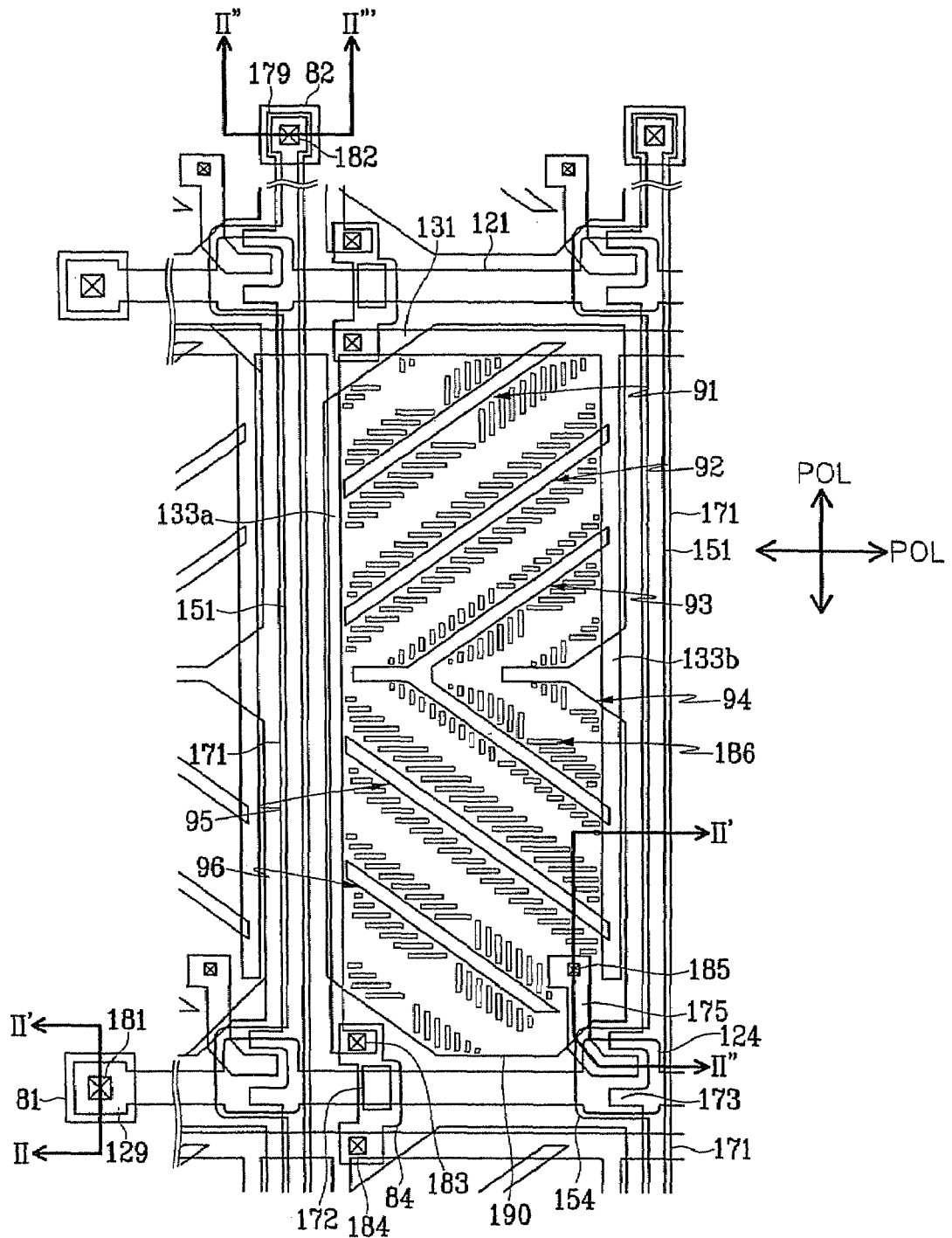
FIG. 1 is a layout view of a TFT array panel of an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, liquid crystal displays and thin film transistor (TFT) array panels for LCDs according to embodiments of the present invention will be described with reference to the accompanying drawings.

An LCD according to an embodiment of the present invention will be described in detail with reference to FIGS. 1-5.

Figure 2:
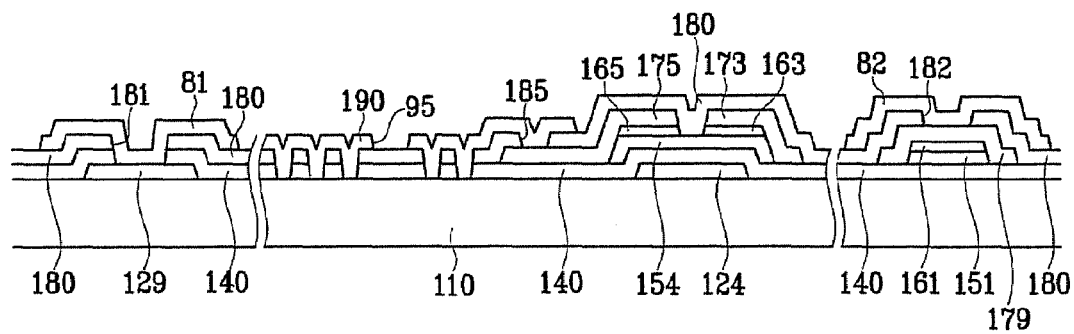
FIG. 2 is a sectional view of the TFT array panel shown in FIG. 1 taken along the lines II-II'-II"-III'"
Figure 3:
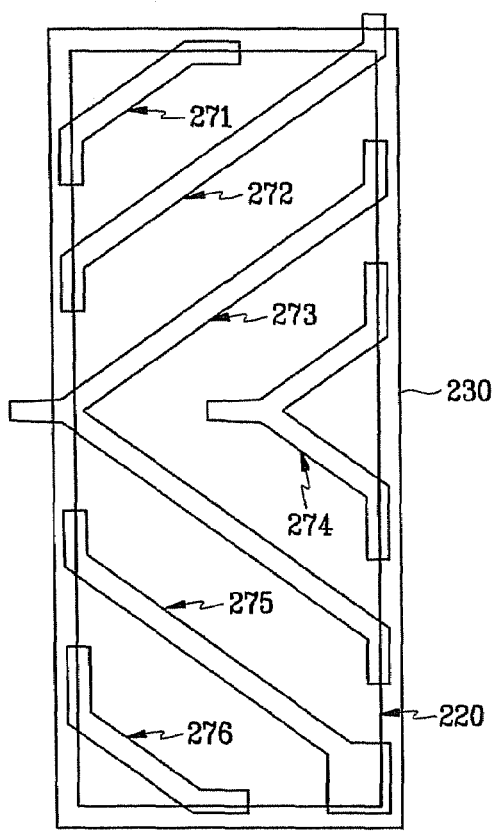
FIG. 3 is a layout view of a common electrode panel of an LCD according to an embodiment of the present invention.
Figure 4:
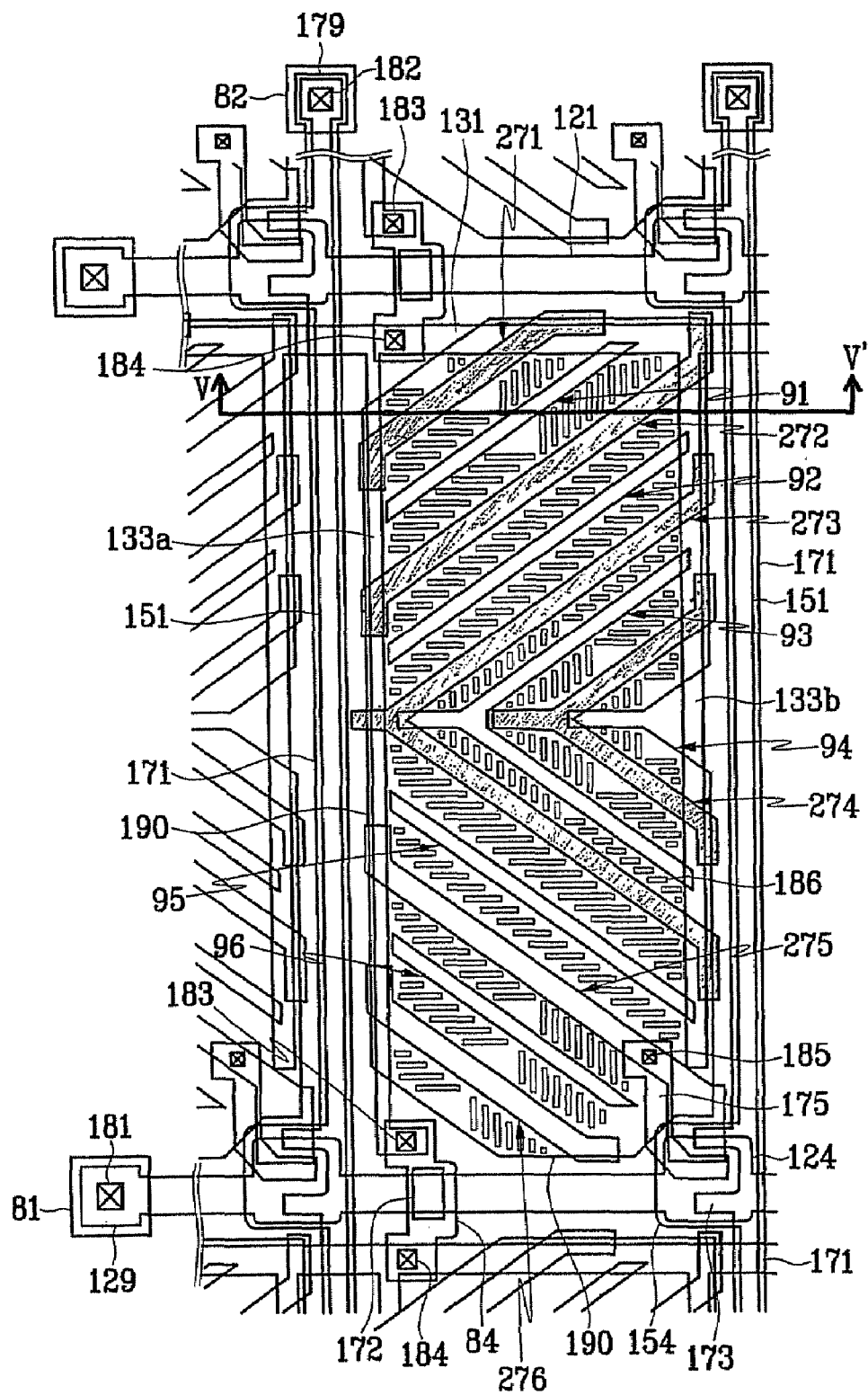
FIG. 4 is a layout view of an LCD including the TFT array panel shown in FIGS. 1 and 2 and the common electrode panel shown in FIG. 3.
Figure 5:
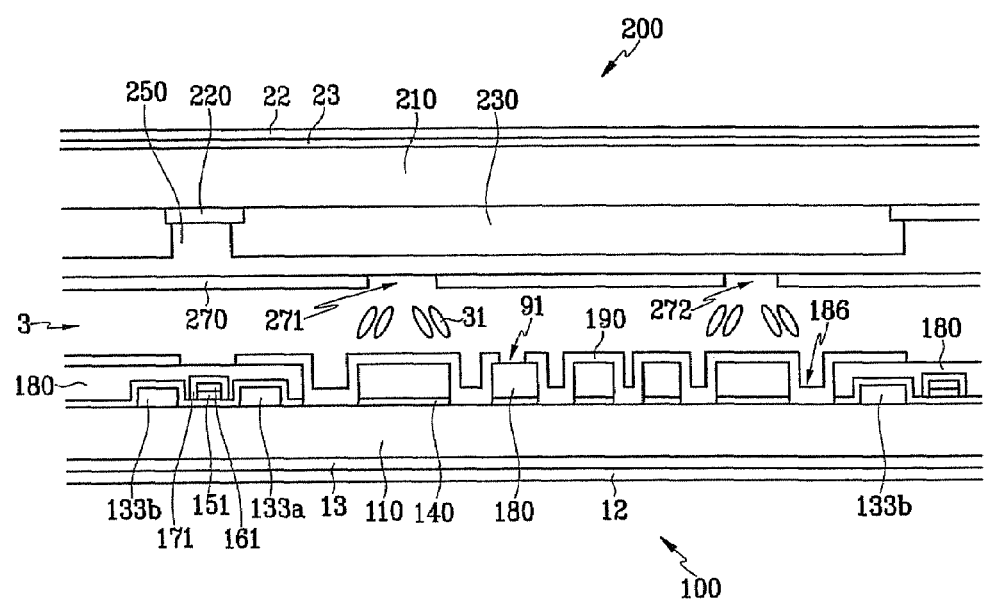
FIG. 5 is a sectional view of the LCD shown in FIG. 4 taken along the line V-V'.

FIG. 1 is a layout view of a TFT array panel of an LCD according to an embodiment of the present invention, FIG. 2 is a sectional view of the TFT array panel shown in FIG. 1 taken along the lines II-II'-II"-III'", FIG. 3 is a layout view of a common electrode panel of an LCD according to an embodiment of the present invention, FIG. 4 is a layout view of an LCD including the TFT array panel shown in FIGS. 1 and 2 and the common electrode panel shown in FIG. 3, and FIG. 5 is a sectional view of the LCD shown in FIG. 4 taken along the line V-V'.

An LCD according to an embodiment of the present invention includes a TFT array panel 100, a common electrode panel 200, and a LC layer 3 interposed between the panels 100 and 200 and containing a plurality of LC molecules 31 aligned substantially vertical to surfaces of the panels 100 and 200.

The TFT array panel 100 is now described in detail with reference FIGS. 1, 2, 4 and 5.

A plurality of gate lines 121 and a plurality of storage electrode lines 131 are formed on an insulating substrate 110 such as transparent glass.

The gate lines 121 extend substantially in a transverse direction and are separated from each other and transmit gate signals. Each gate line 121 includes a plurality of projections forming a plurality of gate electrodes 124 and an end portion 129 having a large area for connection with an external driving circuit.

Each storage electrode line 131 extends substantially in the transverse direction and includes a plurality of sets of branches. Each branch set includes a pair of longitudinal branches forming first and second storage electrodes 133a and 133b. Each of the first storage electrodes 133a has a free end portion and a fixed end portion connected to the storage electrode line 131, and the fixed end portion has a projection. The storage electrode lines 131 are supplied with a predetermined voltage such as a common voltage, which is applied to a common electrode 270 on the common electrode panel 200 of the LCD. Each storage electrode line 131 may include a pair of stems extending in the transverse direction and it may further include a plurality of connections (not shown) connected between the first storage electrodes 133a and the second storage electrodes 133b respectively in adjacent sets of the storage electrodes 133a and 133b.

The gate lines 121 and the storage electrode lines 131 is preferably made of Al containing metal such as Al and Al alloy, Ag containing metal such as Ag and Ag alloy, Cu containing metal such as Cu and Cu alloy, Mo containing metal such as Mo and Mo alloy, Cr, Ti or Ta. The gate lines 121 and the storage electrode lines 131 may have a multi-layered structure including two films having different physical characteristics, a lower film (not shown) and an upper film (not shown). The upper film is preferably made of low resistivity metal including Al containing metal such as Al and Al alloy for reducing signal delay or voltage drop in the gate lines 121 and the storage electrode lines 131. On the other hand, the lower film is preferably made of material such as Cr, Mo and Mo alloy, which has good contact characteristics with other materials such as indium tin oxide (ITO) or indium zinc oxide (IZO). A good exemplary combination of the lower film material and the upper film material is Cr and Al—Nd alloy.

In addition, the lateral sides of the gate lines 121 and the storage electrode lines 131 are inclined relative to a surface of the substrate, and the inclination angle thereof ranges about 20-80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated to "a-Si") or polysilicon are formed on the gate insulating layer 140. Each semiconductor stripe 151 extends substantially in the longitudinal direction and has a plurality of projections 154 branched out toward the gate electrodes 124.

A plurality of ohmic contact stripes and islands 161 and 165 preferably made of silicide or n+ hydrogenated a-Si heavily doped with n type impurity such as phosphorous are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to a surface of the substrate, and the inclination angles thereof are preferably in a range between about 30-80 degrees.

A plurality of data lines 171, a plurality of drain electrodes 175 separated from the data lines 171, and a plurality of isolated metal pieces 172 are formed on the ohmic contacts 161 and 165 and the gate insulating layer 140.

The data lines 171 for transmitting data voltages extend substantially in the longitudinal direction and intersect the gate lines 121 and the storage electrode lines 131. Each data line 171 is disposed between the first and the second storage electrodes 133a and 133b in adjacent sets of the branches 133a and 133b of the storage electrode lines 131 and it includes an end portion 179 having a large area for contact with another layer or an external device. A plurality of branches of each data line 171, which project toward the drain electrodes 175, form a plurality of source electrodes 173. Each drain electrode 175 includes an end portion having a large area for contact with another layer and each source electrode 173 is curved to partly enclose another end portion of the drain electrode 175. A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The metal pieces 172 are disposed on the gate lines 121 near the end portions of the storage electrodes 133a.

The data lines 171, the drain electrodes 175, and the metal pieces 172 are preferably made of refractory metal such as Cr, Mo containing metal, Ti and Ti, or Al containing metal and they may also have a multilayered structure including a lower film (not shown) preferably made of refractory metal and an upper film (not shown) located thereon and preferably made of low resistivity material.

Like the gate lines 121 and the storage electrode lines 131, the data lines 171, the drain electrodes 175, and the metal pieces 172 have tapered lateral sides, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175.

A passivation layer 180 is formed on the data lines 171, the drain electrodes 175, and the exposed portions of the semiconductor stripes 151. The passivation layer 180 is preferably made of photosensitive organic material having a good flatness characteristic, low dielectric insulating material having dielectric constant lower than 4.0 such as a-Si:C:O and a-Si:O:F formed by plasma enhanced chemical vapor deposition (PECVD), or inorganic material such as silicon nitride. The passivation layer 180 may include a lower film of inorganic insulator and an upper film of organic insulator.

The passivation layer 180 has a plurality of contact holes 182 and 185 exposing the end portions 179 of the data lines 171 and the end portions of the drain electrodes 175, respectively. The passivation layer 180 and the gate insulating layer 140 have a plurality of contact holes 181, 183 and 184 exposing the end portions 129 of the gate lines 121, the projections of the free end portions of the first storage electrodes 133a, and portions of the storage electrode lines 131 near the fixed end portions of the first storage electrodes 133a, respectively.

In addition, the passivation layer 180 and the gate insulating layer have a number of rectilinear trenches 186.

A plurality of pixel electrodes 190, a plurality of contact assistants 81 and 82, and a plurality of storage connections 84, which are preferably made of a transparent conductor such as ITO and IZO or a reflective conductor such as Al, are formed on the passivation layer 180.

The pixel electrodes 190 are physically and electrically connected to the drain electrodes 175 through the contact holes 185 such that the pixel electrodes 190 receive the data voltages from the drain electrodes 175.

The pixel electrodes 190 supplied with the data voltages generate electric fields in cooperation with the common electrode 270, which reorient liquid crystal molecules 31 in the liquid crystal layer 3.

A pixel electrode 190 and the common electrode 270 form a liquid crystal capacitor, which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the pixel electrodes 190 with the storage electrode lines 131 including the storage electrodes 133a and 133b.

Each pixel electrode 190 is chamfered at its left corners and the chamfered edges of the pixel electrode 190 make an angle of about 45 degrees with the gate lines 121.

Each pixel electrode 190 has a plurality of upper cutouts 91 and 92, lower cutouts 95 and 96, and center cutouts 93 and 94, which partition the pixel electrode 190 into a plurality of partitions. The upper and the lower cutouts 91, 92, 95 and 96 are disposed at upper and lower halves of the pixel electrode 190, respectively, and the center cutouts 93 and 94 are located between the upper cutouts 91 and 92 and the lower cutouts 95 and 96. The cutouts 91-96 substantially have inversion symmetry with respect to an imaginary transverse center line bisecting the upper and the lower halves of the pixel electrode 190.

The upper and the lower cutouts 91, 92, 95 and 96 make an angle of about 45 degrees to the gate lines 121, and the upper cutouts 91 and 92, which extend substantially parallel to each other and to the chamfered upper left edge of the pixel electrode 190, extend substantially perpendicular to the lower cutouts 95 and 96, which extend substantially parallel to each other and to the chamfered lower left edge of the pixel electrode 190.

The cutouts 91 and 96 extend approximately from a left longitudinal edge of the pixel electrode 190 approximately to transverse edges of the pixel electrode 190. The cutouts 92 and 95 extend approximately from the left edge of the pixel electrode 190 approximately to a right longitudinal edge of the pixel electrode 190.

The center cutout 93 includes a transverse portion extending approximately from the left edge of the pixel electrode 190 along the transverse center line of the pixel electrode 190 and a pair of oblique portions extending from the transverse portion to the right edge of the pixel electrode 190 and extending substantially parallel to the upper cutouts 91 and 92 and the lower cutouts 95 and 96, respectively. The center cutout 94 extends along the transverse center line of the pixel electrode 190 and has an inlet from the right edge of the pixel electrode 190, which has a pair of inclined edges substantially parallel to the upper cutouts 91 and 92 and the lower cutouts 95 and 96, respectively.

Accordingly, the upper half of the pixel electrode 190 is also partitioned into four upper partitions by the upper cutouts 91 and 92 and the center cutout 93, and the lower half of the pixel electrode 190 is partitioned into four lower partitions by the lower cutouts 95 and 96 and the center cutout 93. The number of partitions or the number of the cutouts is varied depending on the design factors such as the size of pixels, the ratio of the transverse edges and the longitudinal edges of the pixel electrodes, the type and characteristics of the liquid crystal layer 3, and so on.

In addition, each pixel electrode 190 has a number of depressions forming along the trenches 186 of the passivation layer 180 and the gate insulating layer 140 and contacting the substrate 110.

In the meantime, the storage electrode lines 131 may further include a plurality of branches (not shown) overlapping the cutouts 91-96 and lower edges of the pixel electrodes 190.

The contact assistants 81 and 82 are connected to the end portions 129 of the gate lines 121 and the end portions 179 of the data lines 171 through the contact holes 181 and 182, respectively. The contact assistants 81 and 82 are not requisites but preferred to protect the end portions 129 and 179 and to complement the adhesiveness of the end portions 129 and 179 and external devices.

The storage connections 84 cross over the gate lines 121 and they are connected to the exposed projection of the fixed end portions of the first storage electrodes 133a and the exposed portions of the storage electrode lines 131 respectively through the contact holes 183 and 184 opposite each other with respect to the gate lines 121. The storage connections 84 overlaps the metal pieces 172 and they may be electrically connected to the metal pieces 172. The storage electrode lines 131 including the storage electrodes 133a and 133b along with the storage connections 84 and the metal pieces 172 are used for repairing defects in the gate lines 121, the data lines 171, or the TFTs. The electrical connection between the gate lines 121 and the storage electrode lines 131 for repairing the gate lines 121 is obtained by illuminating the cross points of the gate lines 121 and the storage connections 84 by a laser beam to electrically connect the gate lines 121 to the storage connections 84. In this case, the metal pieces 172 enhance the electrical connection between the gate lines 121 and the storage connections 84.

The description of the common electrode panel 200 follows with reference to FIGS. 3-5.

A light blocking member 220 called a black matrix for preventing light leakage is formed on an insulating substrate 210 such as transparent glass. The light blocking member 220 may include a plurality of openings that face the pixel electrodes 190 and it may have substantially the same shape as the pixel electrodes 190. The light blocking member 220 is preferably made of a single Cr layer, double layers of Cr and Cr oxide, or an organic layer containing black die.

A plurality of color filters 230 are formed on the substrate 210 and they are disposed substantially in the areas enclosed by the light blocking member 220. The color filters 230 may extend substantially along the longitudinal direction along the pixel electrodes 190. The color filters 230 may represent one of the primary colors such as red, green and blue colors.

An overcoat 250 for preventing the color filters 230 from being exposed and for providing a flat surface is formed on the color filters 230 and the light blocking member 220.

A common electrode 270 preferably made of transparent conductive material such as ITO and IZO is formed on the overcoat 250.

The common electrode 270 has a plurality of sets of cutouts 271-276.

A set of cutouts 271-276 face a pixel electrode 190 and include a plurality of upper and lower cutouts 271 and 272 and 275 and 276 and center cutouts 273 and 274. Each of the cutouts 271-276 is disposed between adjacent cutouts 91-96 of the pixel electrode 190 or between a cutout 91 or 96 and a chamfered edge of the pixel electrode 190. In addition, each of the cutouts 271-276 has at least an oblique portion extending parallel to the upper cutouts 91 and 92 or the lower cutouts 95 and 96 of the pixel electrode 190, and the distances between adjacent two of the cutouts 271-276 and 91-96, the oblique portions thereof, the oblique edges thereof, and the chamfered edges of the pixel electrode 190, which are parallel to each other, are substantially the same. The cutouts 271-276 substantially have inversion symmetry with respect to an imaginary transverse center line of the pixel electrode 190.

Each of the cutouts 271 and 276 has an oblique portion extending approximately from a left edge of the pixel electrode 190 approximately to an upper or lower edge of the pixel electrode 190 and transverse and longitudinal portions extending from respective ends of the oblique portion along edges of the pixel electrode 190, overlapping the edges of the pixel electrode 190, and making obtuse angles with the oblique portion.

Each of the cutouts 272 and 275 has an oblique portion, a longitudinal portion connected to an end of the oblique portion, and an expansion connected to the other end of the oblique portion. The oblique portion extends approximately from the left edge of the pixel electrode 190 approximately to upper right or lower right corner of the pixel electrode 190. The longitudinal portion extends from the end of the oblique portion along the left edge of the pixel electrode 190, overlaps the left edge of the pixel electrode 190, and makes an obtuse angle with the oblique portion. The expansion covers the respective corner of the pixel electrode 190.

The cutout 273 has a pair of oblique portions extending approximately from the center of the left edge of the pixel electrode 190 to the right edge of the pixel electrode 190, a transverse portion extending from a meeting point of the oblique portions to the left, and a pair of longitudinal portions extending from the respective oblique portions along the right edge of the pixel electrode 190, overlapping the right edge of the pixel electrode 190, and making an obtuse angle with the respective oblique portions. The cutout 274 has a transverse portion extending along the transverse center line of the pixel electrode 190, a pair of oblique portions extending from the transverse portion approximately to the right edge of the pixel electrode 190 and making obtuse angles with the transverse portion, and a pair of longitudinal portions extending from the respective oblique portions along the right edge of the pixel electrode 190, overlapping the right edge of the pixel electrode 190, and making an obtuse angle with the respective oblique portions.

The number of the cutouts 271-276 may be varied depending on the design factors, and the light blocking member 220 may also overlap the cutouts 271-276 to block the light leakage through the cutouts 271-276.

In the meantime, the cutouts 271-276 may expose portions of the color filters 230 if there is no overcoat 250, and the exposed portions of the color filters 230 may contaminate the LC layer 3.

Retardation films 13 and 23 for compensating the retardation of the LC layer 3 are disposed on outer surfaces of the panels 100 and 200, and crossed polarizers 12 and 22 are provided on the retardation films 13 and 23, respectively, such that a transmissive axis of the polarizer 12 is parallel to the transverse direction. However, the transmissive axis of the polarizer 12 may be parallel to the longitudinal axis. One of the polarizers may be omitted when the LCD is a reflective LCD.

The LCD may further include homeotropic alignment films (not shown) and these films have depressions forming along the trenches 186 and the depressions of the pixel electrodes 190.

The LC layer 3 has negative dielectric anisotropy and the LC molecules 310 in the LC layer 3 are aligned such that their long axes are substantially vertical to the surfaces of the panels in absence of electric field.

As shown in FIG. 4, a set of the cutouts 91-96 and 271-276 divides a pixel electrode 190 into a plurality of subareas and each subarea has two major edges and is full of the trenches 186. The trenches 186 make an oblique angle, preferably of about 45 degrees, with oblique edges of the cutouts 91-96 and 271-276. It is preferable that the trenches 186 extend parallel to a transmissive (or absorptive) axis of the polarizers 12 and 22 and they are aligned substantially perpendicular to transverse and longitudinal edges of the cutouts 91-96 and 271-276 and of the pixel electrodes 190. In detail, the trenches 186 in each of four parallelogrammic subareas, which has substantially two oblique edges and two longitudinal edges, are aligned in the transverse direction. On the other hand, the trenches 186 in each of twelve trapezoidal subareas, which has substantially two oblique edges, a transverse edge, and a longitudinal edge, have two extending directions depending on the relative distances from the transverse edge and the longitudinal edge. The trenches 186 closer to transverse edge than the longitudinal edge are aligned perpendicular to the transverse edge, while those closer to the longitudinal edge are aligned perpendicular to the longitudinal edge.

The cutouts 91-96 and 271-276 as well as the trenches 186 control the tilt directions of the LC molecules 31 in the LC layer 3. This will be described in detail.

Upon application of the common voltage to the common electrode 270 and a data voltage to the pixel electrodes 190, an electric field substantially perpendicular to the surfaces of the panels 100 and 200 is generated. The LC molecules 31 tend to change their orientations in response to the electric field such that their long axes are perpendicular to the field direction. In addition, the LC molecules 31 near the depressions of the alignment layers generated by the trenches 186 tend to align themselves to the length directions of the depressions.

The cutouts 91-96 and 271-276 of the electrodes 190 and 270 and the edges of the pixel electrodes 190 distort the electric field to have a first horizontal component. The first horizontal component of the electric field is perpendicular to the edges of the cutouts 91-96 and 271-276 and the edges of the pixel electrodes 190.

Like the cutouts 91-96 and 271-276, the depressions of the pixel electrodes 190 generated by the trenches 186 also distort the electric field to have second horizontal components. Since the depressions make angles of about 45 degrees with the cutouts 91-96 and 272-276, the second horizontal components of the electric field make an angle of about 45 degrees with the first component.

Accordingly, the orientations of the LC molecules 31 on each subarea have an azimuthal distribution determined by balancing the aligning forces caused by the geometry of the trenches 186 and caused by the cutouts 91-96 and 271-276, and the azimuthal distribution improves lateral visibility as well as front visibility.

In addition, the trenches 186 themselves contribute to the improvement of the lateral visibility since they scatter the light, which is expected to go to the front side, to go to the lateral side.

In the meantime, the parallelism between the trenches 186 and the transmission (or the absorption) axis is required for maintaining the luminance in a black state where there is no electric field and the perpendicularity between the trenches 186 and the transverse and the longitudinal edges of each subarea is required for preventing textures due to the conflict of the tilt directions given by the trenches 186 and the edges.

At lease one of the cutouts 91-96 and 271-276 can be substituted with protrusions or depressions.

The shapes and the arrangements of the cutouts 91-96 and 271-276 may be modified.

A method of manufacturing the TFT array panel shown in FIGS. 1-5 according to an embodiment of the present invention will be now described in detail with reference to FIGS. 6-9 as well as FIGS. 1-5.

FIGS. 6-9 are sectional views of the TFT array panel shown in FIGS. 1-5 in intermediate steps of a manufacturing method thereof according to an embodiment of the present invention.

Figure 6:
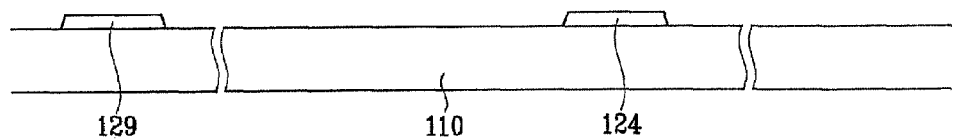
FIGS. 6-9 are sectional views of the TFT array panel shown in FIGS. 1-5 in intermediate steps of a manufacturing method thereof according to an embodiment of the present invention.

Referring to FIG. 6, a conductive layer preferably made of Al containing metal, Ag containing metal, Cu containing metal, Mo containing metal, Cr, Ti or Ta are sputtered and wet or dry etched by photolithography to form a plurality of gate lines 121 including a plurality of gate electrodes 124 and end portions 129 and a plurality of storage electrode lines 131 including a plurality of storage electrodes 133a and 133b.

The conductive layer may include a Mo alloy lower film and an Ag alloy upper film. Both the upper and lower films can be simultaneously etched by an Al etchant containing phosphoric acid, nitric acid, acetic acid and deionized water. In addition, the conductive layer can have an inclined lateral surface making an angle of about 30 degrees since the etching rate of the above-described Al etchant is faster for Al alloy than for Mo alloy.

Figure 7:
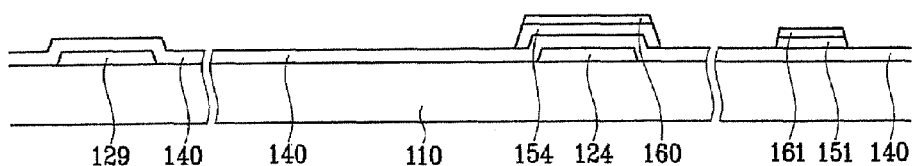

Referring to FIG. 7, after sequential CVD of a gate insulating layer 140 preferably made of silicon nitride or silicon oxide, an intrinsic a-Si layer, and an extrinsic a-Si layer, the extrinsic a-Si layer and the intrinsic a-Si layer are photo-etched to form a plurality of extrinsic semiconductor stripes 164 and a plurality of intrinsic semiconductor stripes 151 including a plurality of projections 154 on the gate insulating layer 140.

Figure 8:
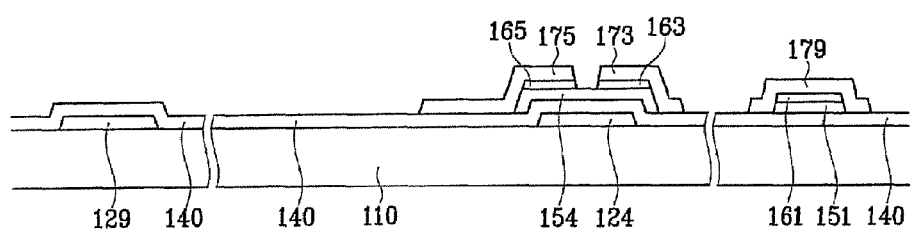

Referring to FIG. 8, a conductive layer preferably made of refractory metal is sputtered and photo-etched to form a plurality of date lines 171 including a plurality of source electrodes 173 and end portions 179, a plurality of drain electrodes 175, and a plurality of metal pieces 172.

Thereafter, portions of the extrinsic semiconductor stripes 164, which are not covered with the data lines 171 and the drain electrodes 175, are removed to complete a plurality of ohmic contact stripes 161 including a plurality of projections 163 and a plurality of ohmic contact islands 165 and to expose portions of the intrinsic semiconductor stripes 151. Oxygen plasma treatment preferably follows in order to stabilize the exposed surfaces of the semiconductor stripes 151.

Figure 9:
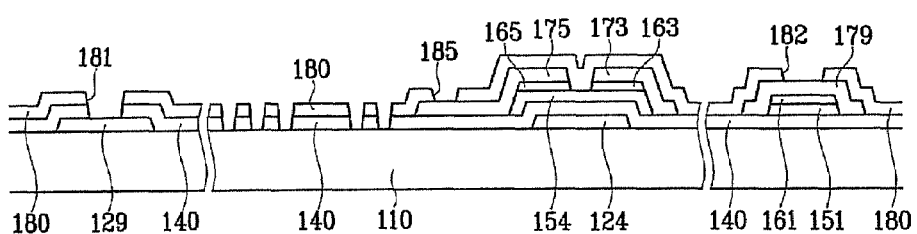

Referring to FIG. 9, a passivation layer 180 is formed by chemical vapor deposition of a-Si:C:Q or a-Si:O:F, by deposition of an inorganic insulator such as silicon nitride, or by coating of an organic insulator such as acrylic material.

The passivation layer 180 and the gate insulating layer 140 are photo-etched to form a plurality of trenches 186 exposing the substrate 110 and a plurality of contact holes 181-185 exposing the end portions 129 of the gate lines 121, the end portions 179 of the data lines 171, the storage electrodes 133a, and the storage electrode lines 131, and the drain electrodes 175.

Finally, a plurality of pixel electrodes 190 having a plurality cutouts 91-96, a plurality of contact assistants 81 and 82, and a plurality of storage connections 84 are formed on the passivation layer 180 and on the exposed portions of the substrate 110, the drain electrodes 175, the end portions 129 and 179, the storage electrodes 133a, the storage electrode lines 131 by sputtering and photo-etching an IZO or ITO layer.

A TFT array panel for an LCD according to another embodiment of the present invention will be described in detail with reference to FIGS. 10A-10C.

Figure 10A:
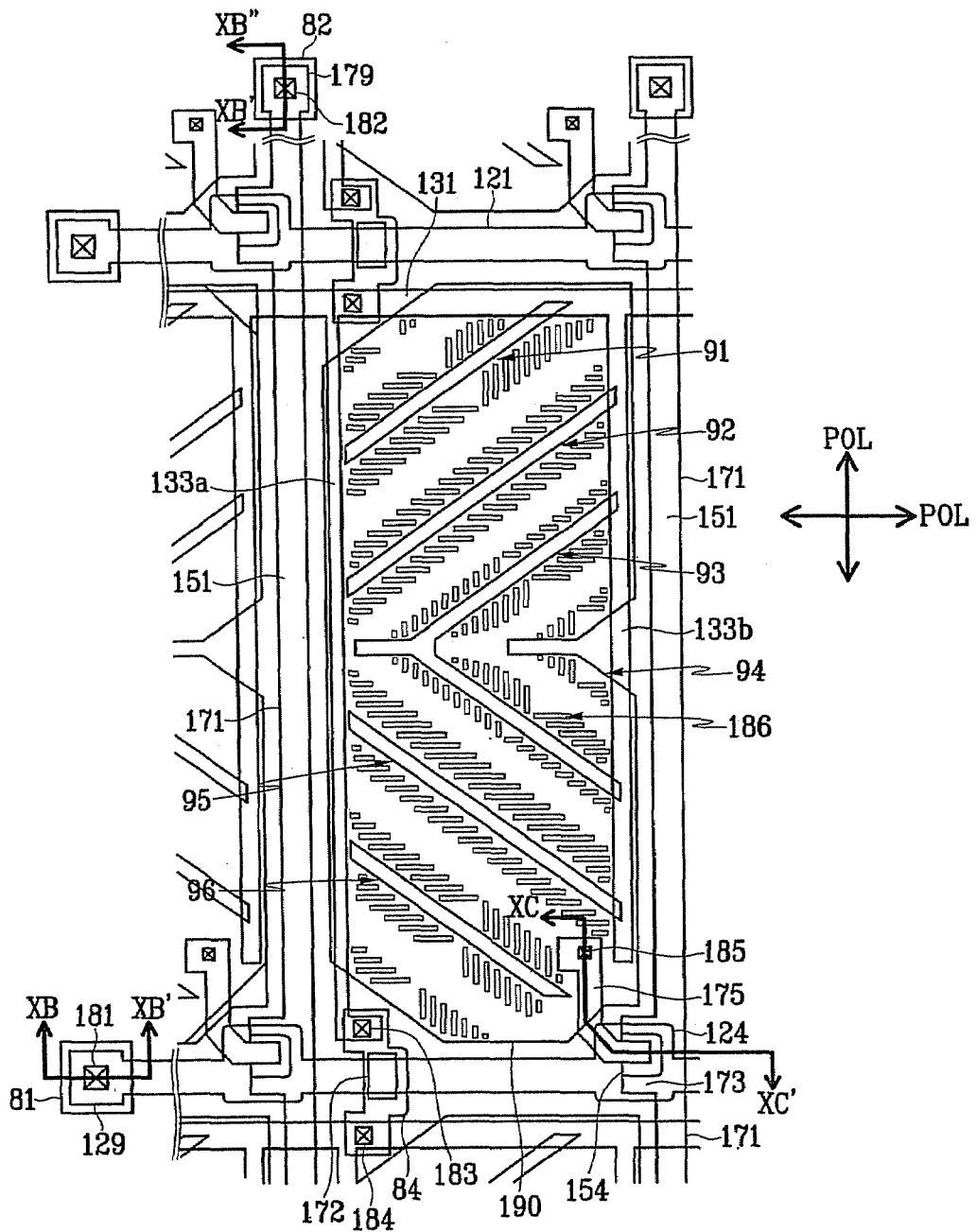
FIG. 10A is a layout view of a TFT array panel for an LCD according to another embodiment of the present invention.
Figure 10B:
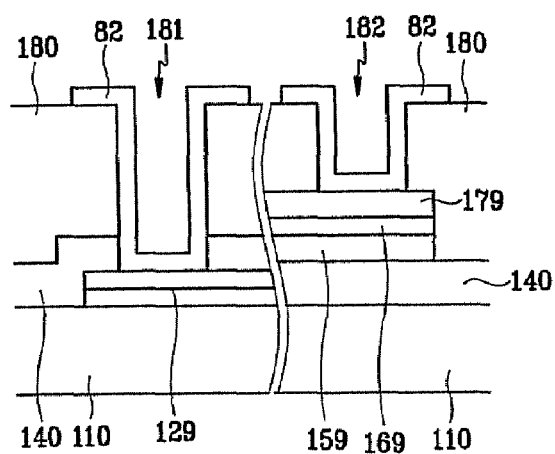
FIG. 10B is a sectional view of the TFT array panel shown in FIG. 10A taken along the line XB-XB'.
Figure 10C:
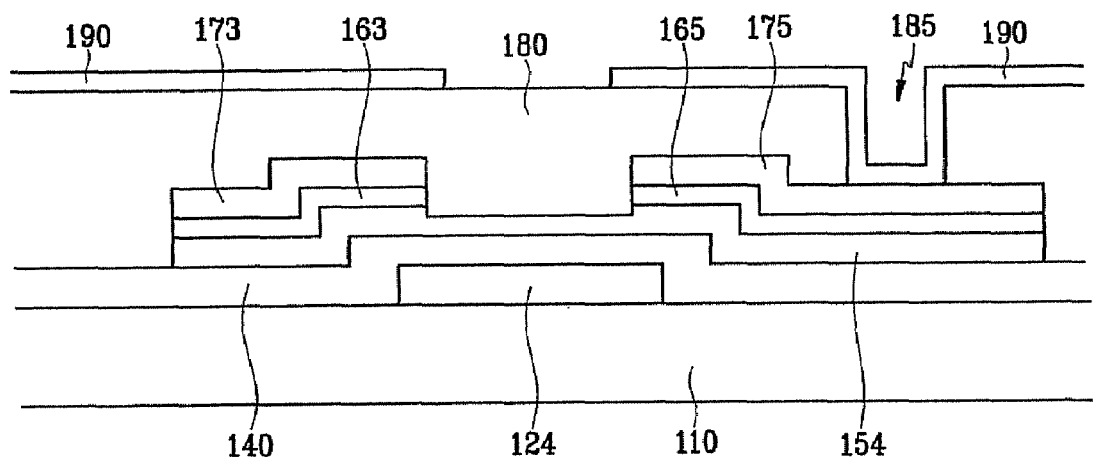
FIG. 10C is a sectional view of the LCD shown in FIG. 10A taken along the lines XC-XC' and XC'-XC"

FIG. 10A is a layout view of a TFT array panel for an LCD according to another embodiment of the present invention, FIG. 10B is a sectional view of the TFT array panel shown in FIG. 10A taken along the line XB-XB', and FIG. 10C is a sectional view of the LCD shown in FIG. 10A taken along the lines XC-XC' and XC'-XC".

Referring to FIGS. 10A-10C, a layered structure of the TFT array panel according to this embodiment is almost the same as that shown in FIGS. 1-5.

In detail, a plurality of gate lines 121 including a plurality of gate electrodes 124 and end portions 129 and a plurality of storage electrode lines 131 including a plurality of storage electrodes 133a and 133b are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and end portions 179, a plurality of drain electrodes 175, and a plurality of isolated metal pieces 172 are formed on the ohmic contacts 161 and 165, and a passivation layer 180 is formed thereon. A plurality of contact holes 181-185 and a plurality of trenches 186 are provided at the passivation layer 180 and the gate insulating layer 140. A plurality of pixel electrodes 190 having a plurality of cutouts 91-96, a plurality of contact assistants 81 and 82, and a plurality of storage connections 84 are formed on the passivation layer 180.

Different from the TFT array panel shown in FIGS. 1-5, the TFT array panel according to this embodiment further provides a plurality of semiconductor islands (not shown) and a plurality of ohmic contact islands (not shown) disposed under the metal pieces 172 and having substantially the same planar shape as the metal pieces 172.

In addition, the semiconductor stripes 151 have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

Many of the above-described features of the TFT array panel shown in FIGS. 1-5 may be appropriate to the LCD shown in FIGS. 10A-10C.

Now, a method of manufacturing the TFT array panel shown in FIGS. 10A-10C according to an embodiment of the present invention will be described in detail.

Figure 11A:
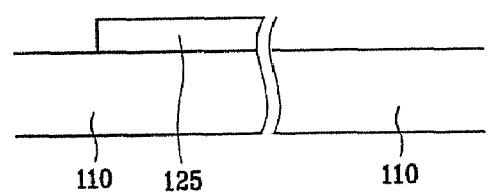
FIGS. 11A and 11B are sectional views of the TFT array panel shown in FIGS. 10A-10C taken along the line XB-XB' and the lines XC-XC' and XC'-XC", respectively, in a first step of a manufacturing method thereof according to an embodiment of the present invention.
Figure 11B:
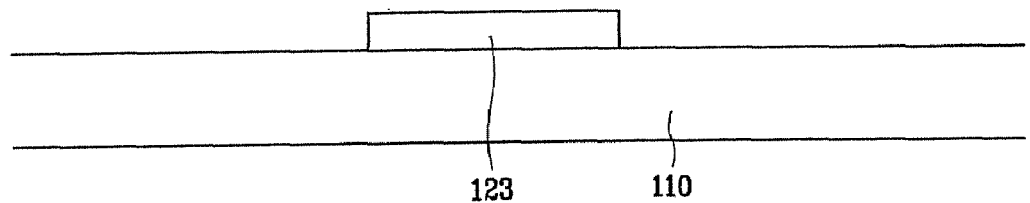
Figure 12A:
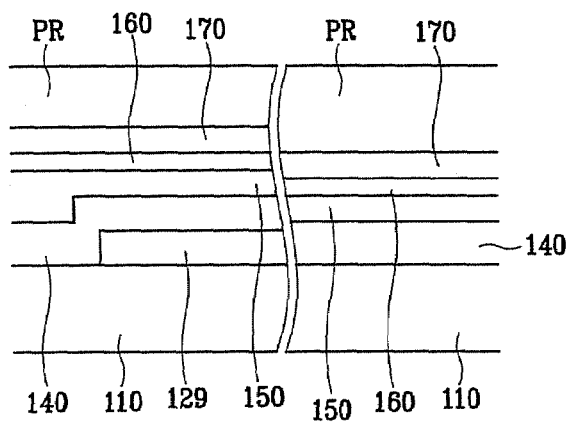
FIGS. 12A and 12B are sectional views of the TFT array panel shown in FIGS. 10A-10C taken along the line XB-XB' and the lines XC-XC' and XC'-XC", respectively, in the step of the manufacturing method following the step shown in FIGS. 11A and 11B.
Figure 12B:
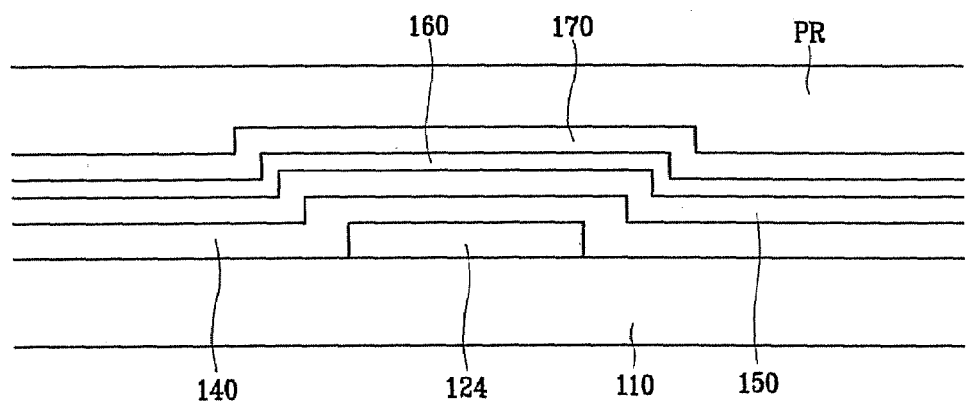
Figure 13A:
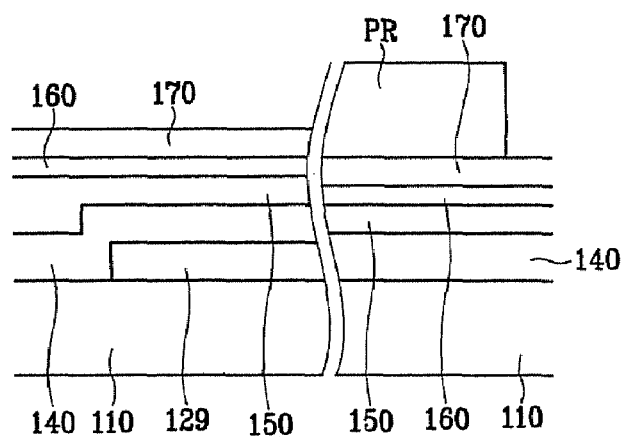
FIGS. 13A and 13B are sectional views of the TFT array panel shown in FIGS. 10A-10C taken along the line XB-XB' and the lines XC-XC' and XC'-XC", respectively, in the step of the manufacturing method following the step shown in FIGS. 12A and 12B.
Figure 13B:
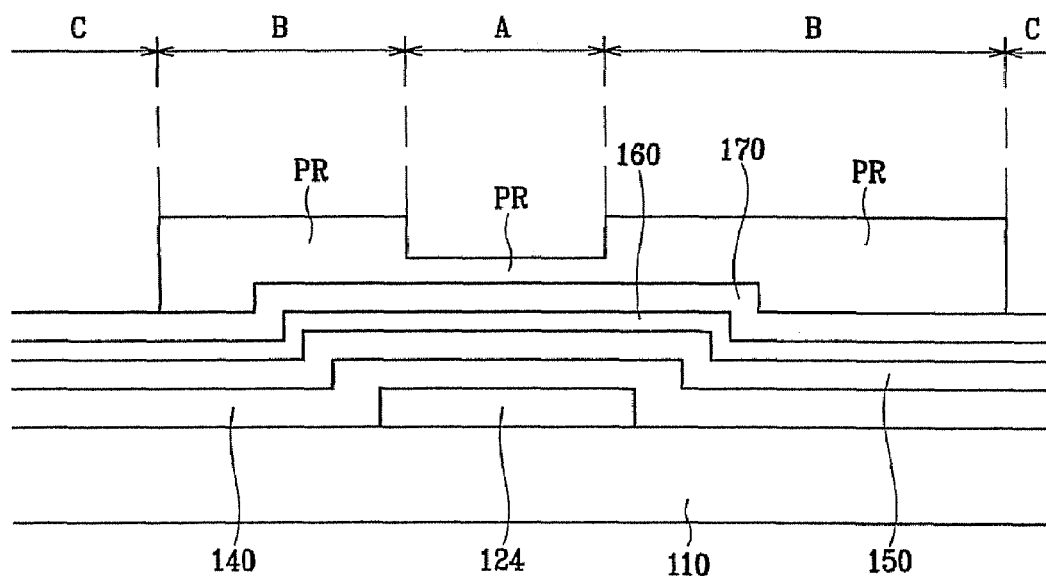
Figure 14A:
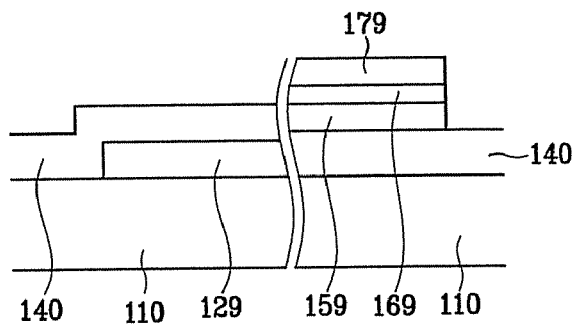
FIGS. 14A and 14B are sectional views of the TFT array panel shown in FIGS. 10A-10C taken along the line XB-XB' and the lines XC-XC' and XC'-XC", respectively, in the step of the manufacturing method following the step shown in FIGS. 13A and 13B.
Figure 14B:
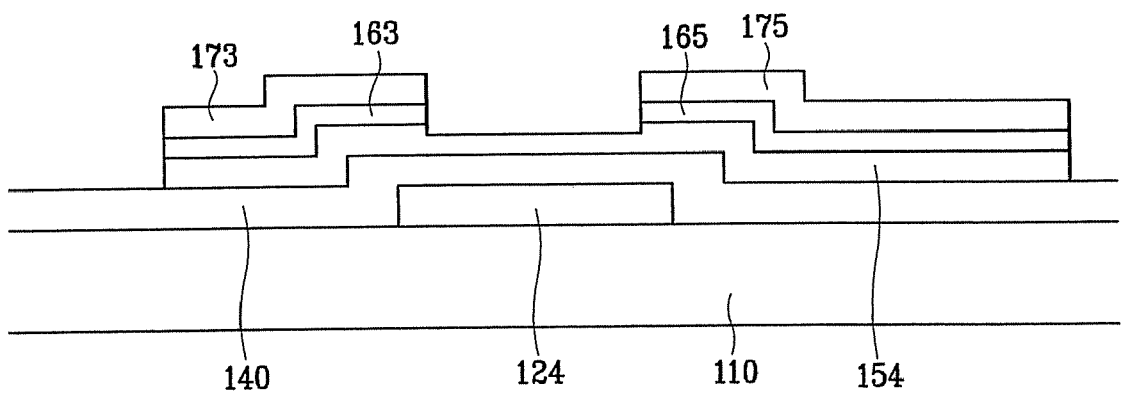
Figure 15A:
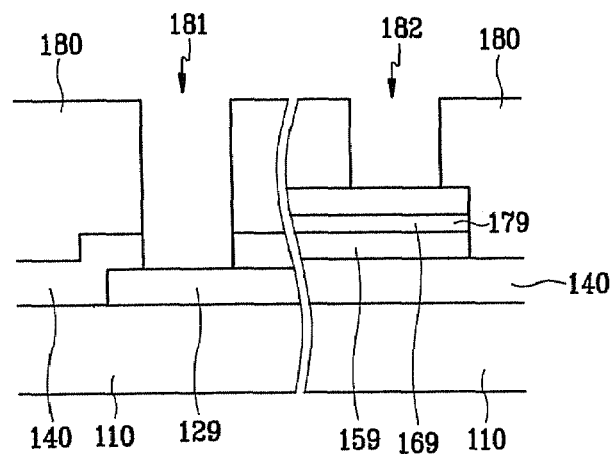
FIGS. 15A and 15B are sectional views of the TFT array panel shown in FIGS. 10A-10C taken along the line XB-XB' and the lines XC-XC' and XC'-XC", respectively, in the step of the manufacturing method following the step shown in FIGS. 14A and 14B.
Figure 15B:
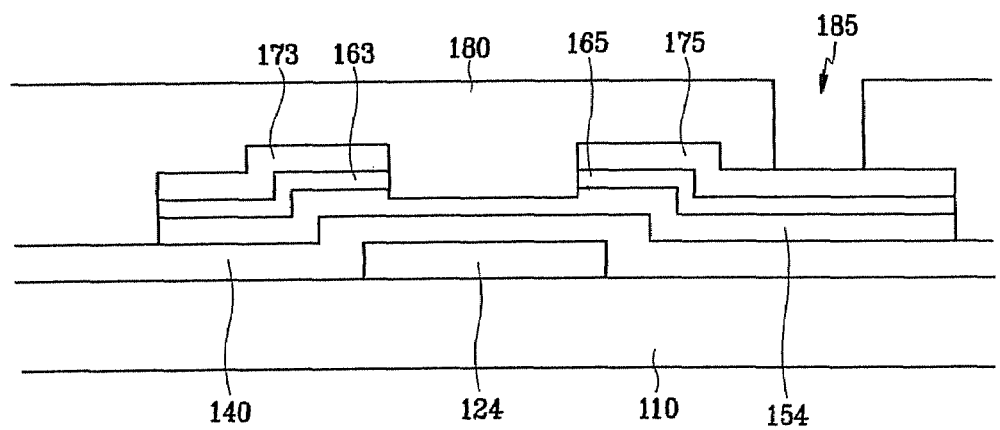

FIGS. 11A and 11B are sectional views of the TFT array panel shown in FIGS. 10A-10C taken along the line XB-XB' and the lines XC-XC' and XC'-XC", respectively, in a first step of a manufacturing method thereof according to an embodiment of the present invention; FIGS. 12A and 12B are sectional views of the TFT array panel shown in FIGS. 10A-10C taken along the line XB-XB' and the lines XC-XC' and XC'-XC", respectively, in the step of the manufacturing method following the step shown in FIGS. 11A and 11B; FIGS. 13A and 13B are sectional views of the TFT array panel shown in FIGS. 10A-10C taken along the line XB-XB' and the lines XC-XC' and XC'-XC", respectively, in the step of the manufacturing method following the step shown in FIGS. 12A and 12B; FIGS. 14A and 14B are sectional views of the TFT array panel shown in FIGS. 10A-10C taken along the line XB-XB' and the lines XC-XC' and XC'-XC", respectively, in the step of the manufacturing method following the step shown in FIGS. 13A and 13B; and FIGS. 15A and 15B are sectional views of the TFT array panel shown in FIGS. 10A-10C taken along the line XB-XB' and the lines XC-XC' and XC'-XC", respectively, in the step of the manufacturing method following the step shown in FIGS. 14A and 14B.

Referring to FIGS. 11A and 11B, a conductive layer is sputtered on an insulating substrate 110 and they are wet or dry etched in sequence to form a plurality of gate lines 121, each including a plurality of gate electrodes 124 and an expansion 129, and a plurality of storage electrode lines 131 including a plurality of storage electrodes 133a and 133b.

Referring to FIGS. 12A and 12B, a gate insulating layer 140, an intrinsic a-Si layer 150, and an extrinsic a-Si layer 160 are sequentially deposited by CVD and a conductive layer 170 is deposited by sputtering, and a photoresist film PR with the thickness of about 1-2 microns is coated on the conductive layer 170.

Referring to FIGS. 13A and 13B, the photoresist film PR is exposed to light through a slit photo-mask (not shown) including slit areas (not shown), and developed such that the developed photoresist PR has a position dependent thickness. The photoresist shown in FIGS. 13A and 13B includes a plurality of first to third portions with decreased thickness. The first portions are located on first areas B (referred to as "wire areas" hereinafter) and the second portions are located on second areas A (referred to as "channel areas" hereinafter), respectively, while the third portions located on remaining third areas C are not illustrated in the figures since they have substantially zero thickness to expose underlying portions of the conductive layer 170. The thickness of the second portions on the channel areas A is preferably smaller than half of that of the first portions on the wire areas B, and more preferably, it is smaller than about 4,000 Å.

The different thickness of the photoresist PR enables to selectively etch the underlying layers when using suitable process conditions. Therefore, a plurality of data lines 171 including a plurality of source electrodes 173, a plurality of drain electrodes 175, and a plurality of isolated metal pieces 172 as well as a plurality of ohmic contact stripes 161 including a plurality of projections 163, a plurality of ohmic contact islands 165, a plurality of semiconductor stripes 151 including a plurality of projections 154, and a plurality of semiconductor and ohmic contact islands (not shown) disposed under the metal pieces 172 are obtained by a series of etching steps as shown in FIGS. 14A and 14B.

For descriptive purpose, portions of the conductive layer 170, the extrinsic a-Si layer 160, and the intrinsic a-Si layer 150 on the wire areas B are called first portions, portions of the conductive layer 170, the extrinsic a-Si layer 160, and the intrinsic a-Si layer 150 on the channel areas A are called second portions, and portions of the conductive layer 170, the extrinsic a-Si layer 160, and the intrinsic a-Si layer 150 on the third areas C are called third portions.

An exemplary sequence of forming such a structure is as follows:

(1) Removal of third portions of the conductive layer 170, the extrinsic a-Si layer 160 and the intrinsic a-Si layer 150 on the wire areas B;

(2) Removal of the second portions of the photoresist;

(3) Removal of the second portions of the conductive layer 170 and the extrinsic a-Si layer 160 on the channel areas A; and (4) Removal of the first portions of the photoresist.

Another exemplary sequence is as follows:

(1) Removal of the third portions of the conductive layer 170;

(2) Removal of the second portions of the photoresist;

(3) Removal of the third portions of the extrinsic a-Si layer 160 and the intrinsic a-Si layer 150;

(4) Removal of the second portions of the conductive layer 170;

(5) Removal of the first portions of the photoresist; and (6) Removal of the second portions of the extrinsic a-Si layer 160.

The first example is described in detail.

At first, the exposed third portions of the conductive layer 170 on the third areas C are removed by wet etching or dry etching to expose the underlying third portions of the extrinsic a-Si layer 160.

Next, the third portions of the extrinsic a-Si layer 160 on the third areas C and of the intrinsic a-Si layer 150 are removed preferably by dry etching and the second portions of the photoresist PR are removed by ashing to expose the second portions of the conductors 170. The removal of the second portions of the photoresist PR are performed either simultaneously with or independent from the removal of the third portions of the extrinsic a-Si layer 160 and of the intrinsic a-Si layer 150. Residue of the second portions of the photoresist PR remained on the channel areas A is removed by ashing.

The semiconductor stripes 151 and the metal pieces 172 as well as the semiconductor and ohmic contact islands under the metal pieces 172 are completed in this step.

Next, the second portions of the conductors 170 and the extrinsic a-Si layer 160 on the channel areas A as well as the first portion of the photoresist PR are removed. At this time, the second portions of the semiconductor stripes 151 may be subject to thickness reduction.

In this way, each conductor 170 is divided into a data line 171 and a plurality of drain electrodes 175 to be completed, and the extrinsic a-Si layer 160 is divided into an ohmic contact stripe 161 and a plurality of ohmic contact islands 165 to be completed.

Referring to FIGS. 15A and 15B, a passivation layer 180 is deposited and patterned along with the gate insulating layer 140 to form a plurality of contact holes 181-185 and a plurality of trenches 186.

Finally, a plurality of pixel electrodes 190, a plurality of contact assistants 81 and 82, and a plurality of storage connections 84 are formed on the passivation layer 180 and the substrate 110 and on the exposed portions of the gate insulating layer 140, the drain electrodes 175, the expansions 129 of the gate lines 121, and the expansions 179 of the data lines 171 by sputtering and photo-etching an IZO or ITO film with thickness of about 400-500 Å as shown in FIGS. 10A-10C.

As a result, the manufacturing process is simplified by omitting a photolithography step.

An LCD according to another embodiment of the present invention will be described in detail with reference to FIG. 16.

Figure 16:
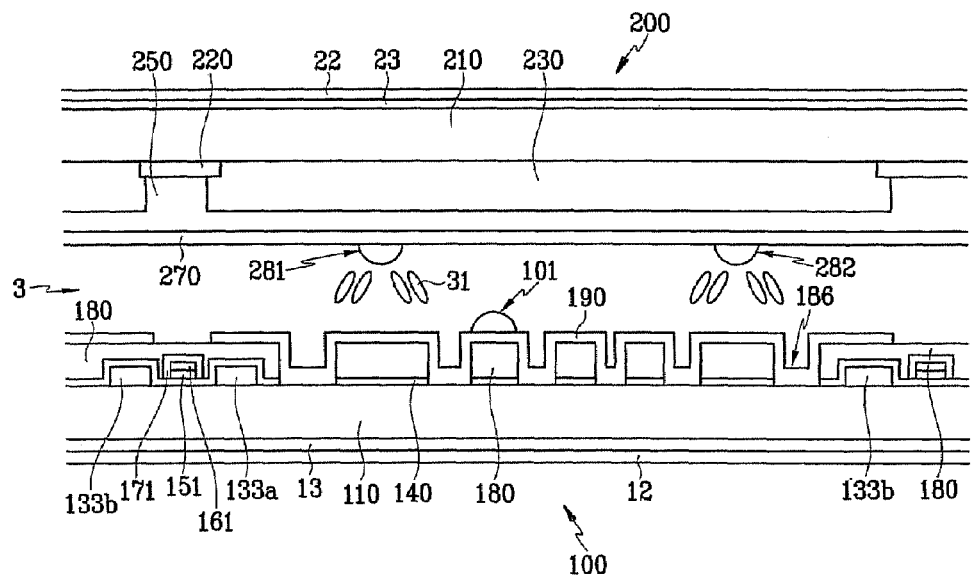
FIG. 16 is a sectional view of an LCD shown in FIG. 4 taken along the line V-V' according to another embodiment of the present invention.

FIG. 16 is a sectional view of an LCD shown in FIG. 4 taken along the line V-V' according to another embodiment of the present invention. It is noted that reference numerals 91-96 and 271-276 shown in FIG. 4 should be changed into 101-106 and 281-286.

Referring to FIG. 16, an LCD according to this embodiment also includes a TFT array panel 100, a common electrode panel 200, and a LC layer 3 interposed therebetween and including a number of LC molecules 31.

Layered structures of the panels 100 and 200 according to this embodiment are almost the same as those shown in FIG. 5.

Regarding the TFT array panel 100, a plurality of gate lines 121 including a plurality of gate electrodes 124 and end portions 129 and a plurality of storage electrode lines 131 including a plurality of storage electrodes 133a and 133b are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and end portions 179, a plurality of drain electrodes 175, and a plurality of isolated metal pieces 172 are formed on the ohmic contacts 161 and 165, and a passivation layer 180 is formed thereon. A plurality of contact holes 181-185 and a plurality of trenches 186 are provided at the passivation layer 180 and the gate insulating layer 140. A plurality of pixel electrodes 190, a plurality of contact assistants 81 and 82, and a plurality of storage connections 84 are formed on the passivation layer 180.

Regarding the common electrode panel 200, a light blocking member 220, a plurality of color filters 230, an overcoat 250, and a common electrode 270 are formed on an insulating substrate 210.

Retardation films 13 and 23 for compensating the retardation of the LC layer 3 are disposed on outer surfaces of the panels 100 and 200, and a pair of polarizers 12 and 22 are provided on the retardation films 13 and 23.

Different from the LCD shown in FIG. 5, a plurality of protrusions 101-106 are provided on the pixel electrodes 190 instead of the cutouts 91-96 shown in FIG. 5, and a plurality of protrusions 281-286 are provided on the common electrode 270 instead of the cutouts 271-276 shown in FIG. 5.

The protrusions 101-106 and 281-286 play substantially the same role as the cutouts 91-96 and 271-276. That is, the protrusions 101-106 and 281-286 cause a horizontal component in an electric field generated in the LC layer 3. In addition, the protrusions 101-106 and 281-286 cause pretilt of the LC molecules 31 that is perpendicular to edges of the protrusions. As described above, the trenches 186 induce the LC molecules 31 to align their length directions. Accordingly, the orientations of the LC molecules 31 on each subarea enclosed by the protrusions 101-106 and 281-286 and chamfered edges of the pixel electrodes 190 have an azimuthal distribution made by balancing the aligning forces caused by the geometry of the trenches 186 and caused by the protrusions 101-106 and 281-286, which improves lateral visibility as well as front visibility.

Many of the above-described features of the LCD shown in FIGS. 1-5 may be appropriate to the LCD shown in FIG. 16.

An LCD according to another embodiment of the present invention will be described in detail with reference to FIG. 17.

Figure 17:
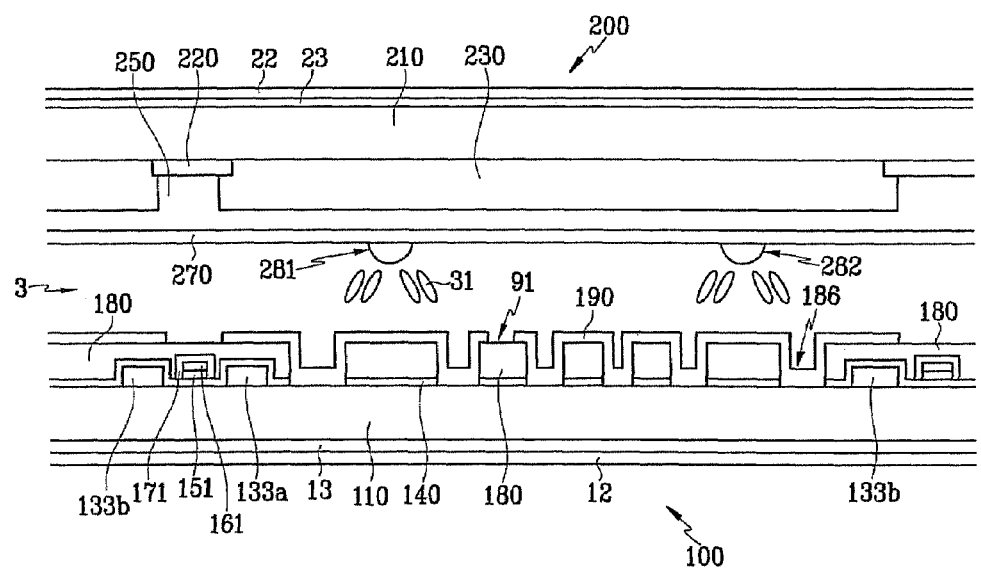
FIG. 17 is a sectional view of an LCD shown in FIG. 4 taken along the line V-V' according to another embodiment of the present invention.

FIG. 17 is a sectional view of an LCD shown in FIG. 4 taken along the line IV-IV' according to another embodiment of the present invention. It is noted that reference numerals 271-276 shown in FIG. 4 should be changed into 281-286.

Referring to FIG. 17, an LCD according to this embodiment also includes a TFT array panel 100, a common electrode panel 200, and a LC layer 3 interposed therebetween and including a number of LC molecules 31.

Layered structures of the panels 100 and 200 according to this embodiment are almost the same as those shown in FIGS. 5 and 16. More exactly, the structure of the LCD shown in FIG. 17 is a hybrid of those shown in FIGS. 5 and 16.

Regarding the TFT array panel 100, a plurality of gate lines 121 including a plurality of gate electrodes 124 and end portions 129 and a plurality of storage electrode lines 131 including a plurality of storage electrodes 133a and 133b are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and end portions 179, a plurality of drain electrodes 175, and a plurality of isolated metal pieces 172 are formed on the ohmic contacts 161 and 165, and a passivation layer 180 is formed thereon. A plurality of contact holes 181-185 and a plurality of trenches 186 are provided at the passivation layer 180 and the gate insulating layer 140. A plurality of pixel electrodes 190, a plurality of contact assistants 81 and 82, and a plurality of storage connections 84 are formed on the passivation layer 180.

Regarding the common electrode panel 200, a light blocking member 220, a plurality of color filters 230, an overcoat 250, and a common electrode 270 are formed on an insulating substrate 210.

Retardation films 13 and 23 for compensating the retardation of the LC layer 3 are disposed on outer surfaces of the panels 100 and 200, and a pair of polarizers 12 and 22 are provided on the retardation films 13 and 23.

The LCD according to this embodiment provides a plurality of cutouts 91-96 at the pixel electrodes 190 like FIG. 5, while it provides a plurality of protrusions 281-286 on the common electrode 270 like FIG. 16.

Accordingly, the orientations of the LC molecules 31 on each subarea enclosed by the cutouts 91-96, the protrusions 281-286 and chamfered edges of the pixel electrodes 190 have an azimuthal distribution made by balancing the aligning forces caused by the geometry of the trenches 186 and caused by the cutouts 91-96 and the protrusions 281-286, which improves lateral visibility as well as front visibility.

Many of the above-described features of the LCD shown in FIGS. 5 and 16 may be appropriate to the LCD shown in FIG. 17.

An LCD according to another embodiment of the present invention will be described in detail with reference to FIGS. 18-21 as well as FIGS. 22 and 23.

Figure 18:
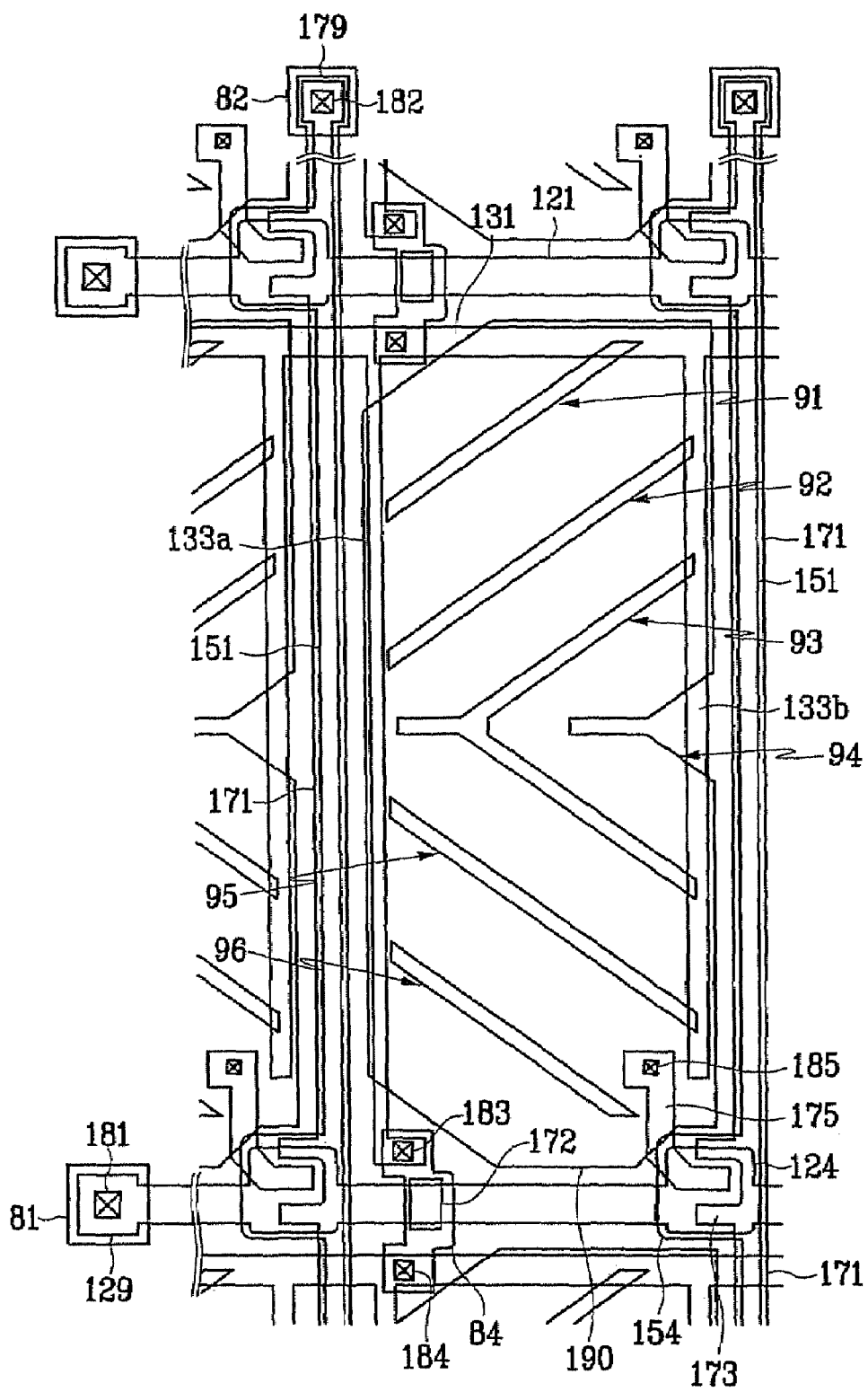
FIG. 18 is a layout view of a TFT array panel of an LCD according to an embodiment of the present invention.
Figure 19:
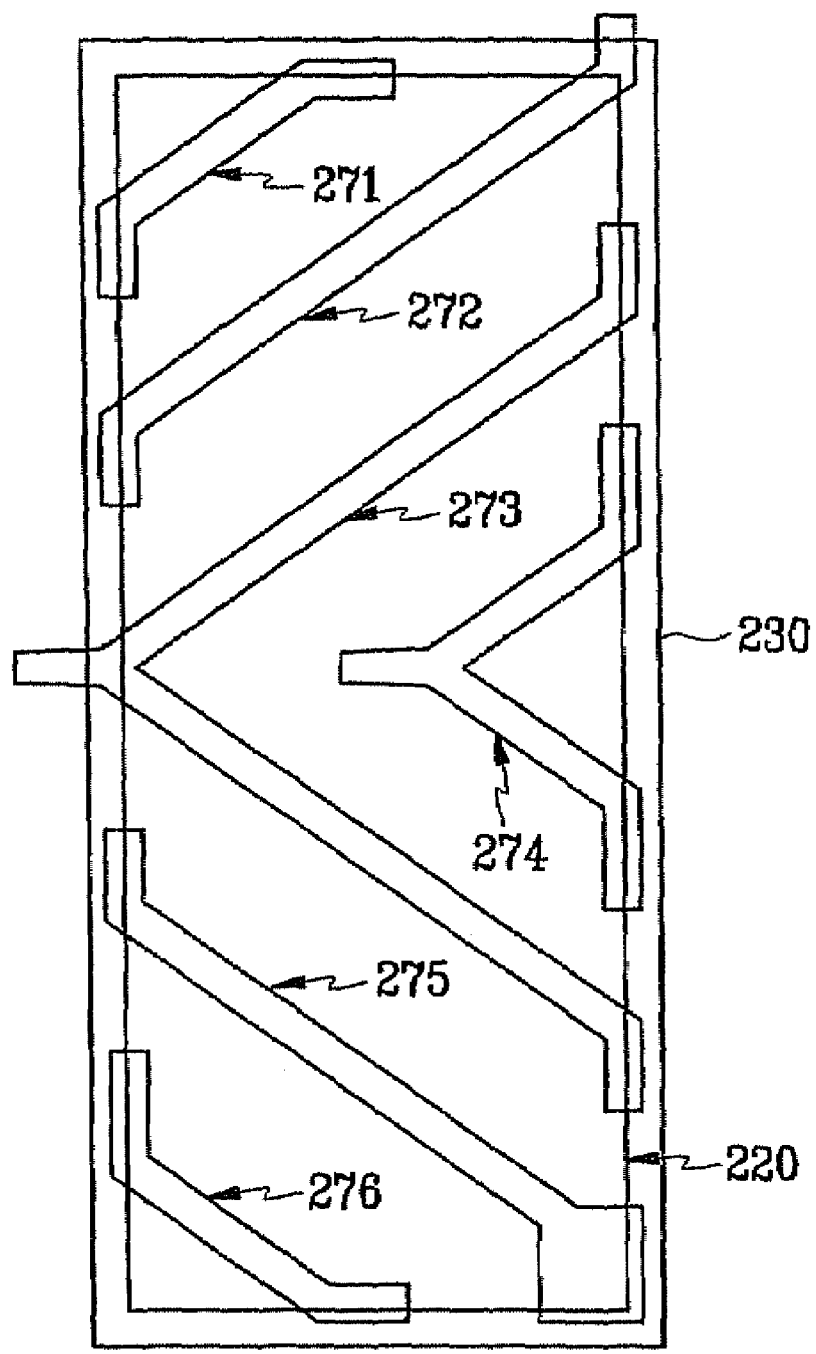
FIG. 19 is a layout view of a common electrode panel of an LCD according to an embodiment of the present invention.
Figure 20:
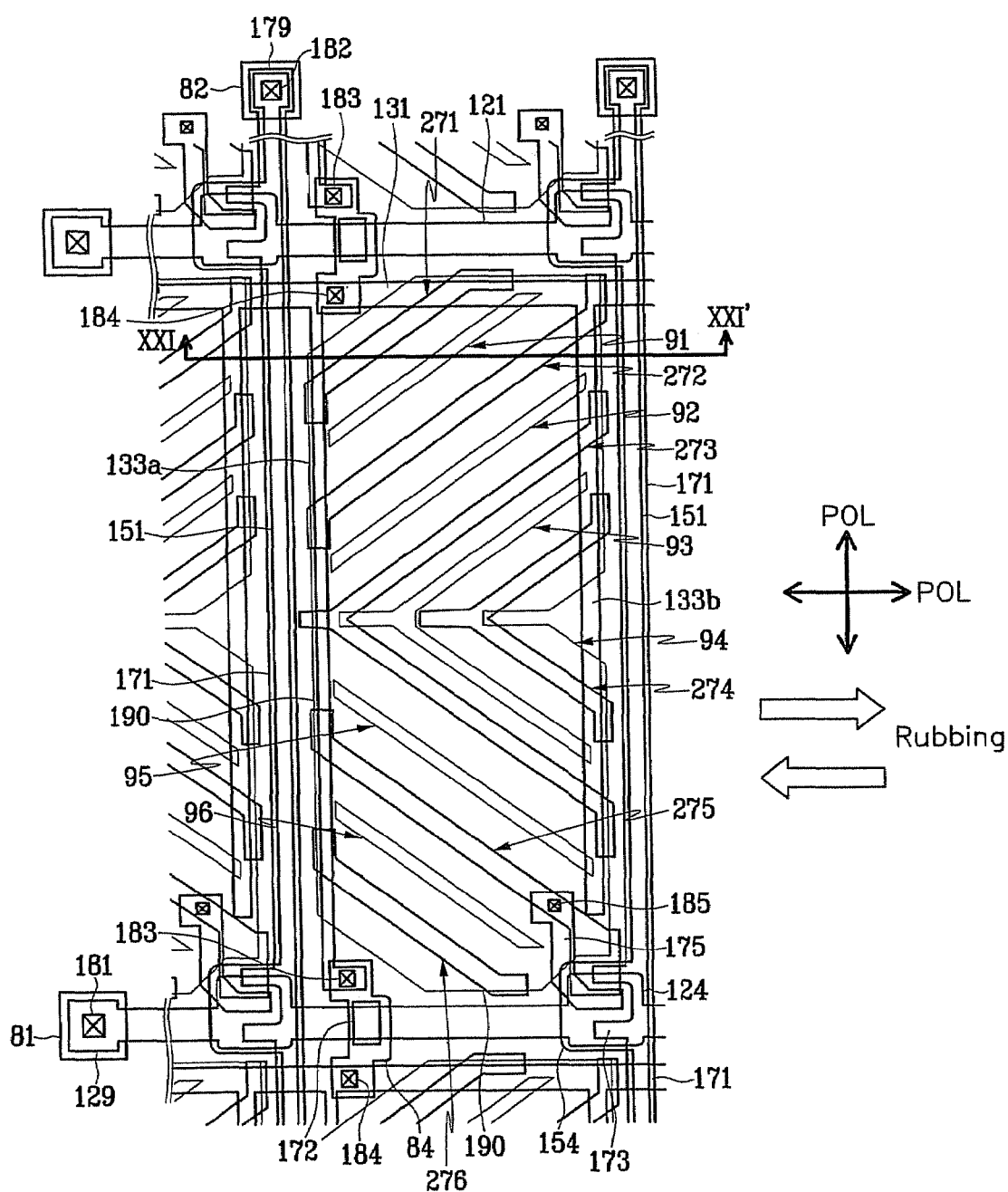
FIG. 20 is a layout view of an LCD including the TFT array panel shown in FIG. 18 and the common electrode panel shown in FIG. 19.
Figure 21:
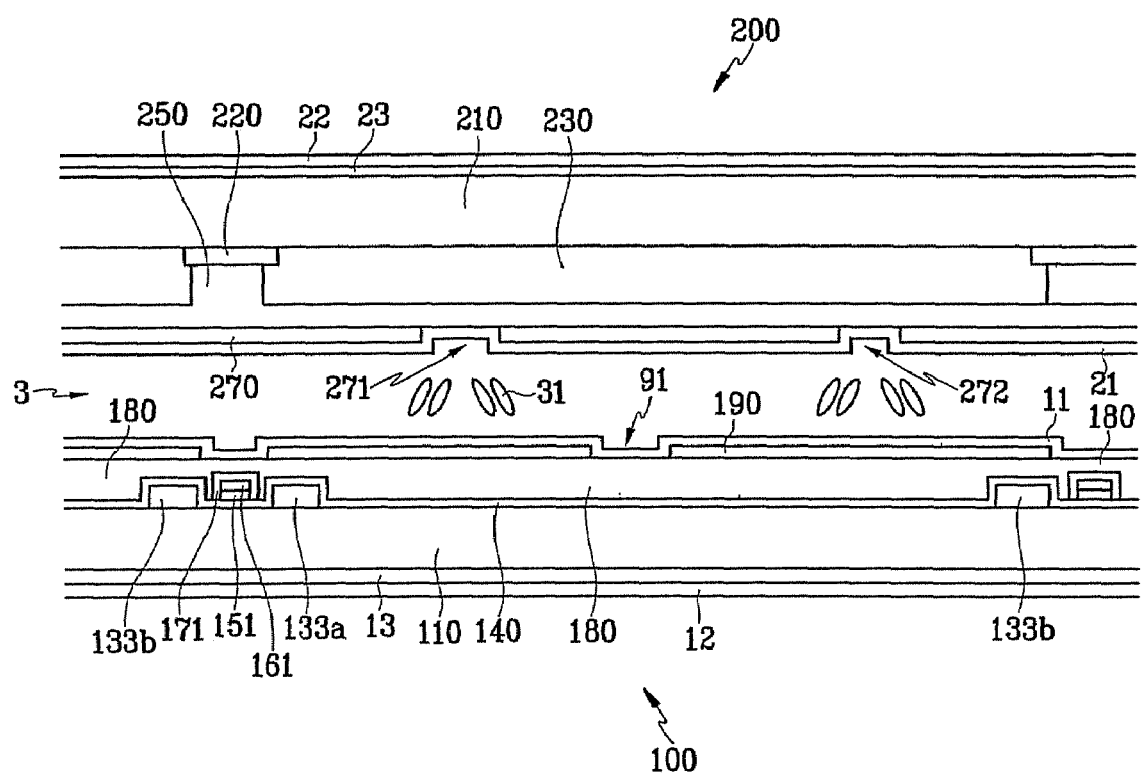
FIG. 21 is a sectional view of the LCD shown in FIG. 20 taken along the line XXI-XXI'.

FIG. 18 is a layout view of a TFT array panel of an LCD according to an embodiment of the present invention, FIG. 19 is a layout view of a common electrode panel of an LCD according to an embodiment of the present invention, FIG. 20 is a layout view of an LCD including the TFT array panel shown in FIG. 18 and the common electrode panel shown in FIG. 19, and FIG. 21 is a sectional view of the LCD shown in FIG. 20 taken along the line XXI-XXI'.

Referring to FIGS. 18-21, an LCD according to this embodiment also includes a TFT array panel 100, a common electrode panel 200, and a LC layer 3 interposed therebetween and including a number of LC molecules 31.

Layered structures of the panels 100 and 200 according to this embodiment are almost the same as those shown in FIGS. 1-5.

Regarding the TFT array panel 100, a plurality of gate lines 121 including a plurality of gate electrodes 124 and end portions 129 and a plurality of storage electrode lines 131 including a plurality of storage electrodes 133a and 133b are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and end portions 179, a plurality of drain electrodes 175, and a plurality of isolated metal pieces 172 are formed on the ohmic contacts 161 and 165, and a passivation layer 180 is formed thereon. A plurality of contact holes 181-185 are provided at the passivation layer 180 and the gate insulating layer 140. A plurality of pixel electrodes 190 having a plurality of cutouts 91-96, a plurality of contact assistants 81 and 82, and a plurality of storage connections 84 are formed on the passivation layer 180.

Regarding the common electrode panel 200, a light blocking member 220, a plurality of color filters 230, an overcoat 250, and a common electrode 270 having a plurality of cutouts 271-276 are formed on an insulating substrate 210.

Retardation films 13 and 23 for compensating the retardation of the LC layer 3 are disposed on outer surfaces of the panels 100 and 200, and crossed polarizers 12 and 22 are provided on the retardation films 13 and 23, respectively, such that one of their polarization axes is parallel to the transverse direction or the longitudinal direction.

A pair of alignment layers 11 and 21, which are not shown in FIG. 5 but may be also provided, are coated on inner surfaces of the panels 100 and 200.

Different from the LCD shown in FIGS. 1-5, there is no trench at the passivation layer 180.

Instead, the alignment layers 11 and 21 preferably made of polyimide or polyamide are rubbed in a direction making an oblique angle, preferably of about 40-50 degree and more preferably of about 45 degrees, with oblique edges of the cutouts 91-96 and 271-276. It is preferable that the rubbing directions are parallel to a polarization axis POL of the polarizers 12 and 22 such that the luminance in a black state of the LCD is minimized. It is also preferable that the rubbing directions are antiparallel but they may be parallel. The rubbing makes the LC molecules 31 near the alignments layers 11 and 21 tilt along the rubbing directions upon application of an electric field to the LC layer 3, and antiparallel rubbing directions make the LC molecules 31 tilt in opposite directions.

The predetermined tilt direction is referred to as "the pretilt direction" hereinafter and the treatment for providing the pretilt direction such as the rubbing is referred to as "the pretilt treatment."

The provisions of the above-described trenches 186 can be also considered as a kind of the pretilt treatment. The pretilt direction may be also obtained by illuminating a polarized light onto the alignment layers 11 and 21. The pretilt treatment may cause the LC molecules 31 to be slightly inclined relative to a direction normal to surfaces of the alignment layers 11 and 21.

The pretilt treatment may be performed to only one of the alignment layers 11 and 21. When pretilt treatment is performed to the alignment layer 11, the pretilt direction is preferably parallel to the polarization axis POL of the polarizer 12. On the contrary, the pretilt direction is preferably parallel to the polarization axis POL of the polarizer 22 when the pretilt treatment is performed at the alignment layer 21. As described above, the parallelism between the pretilt direction and one of the polarization axes POL minimizes the light leakage in the black state.

Figure 22:
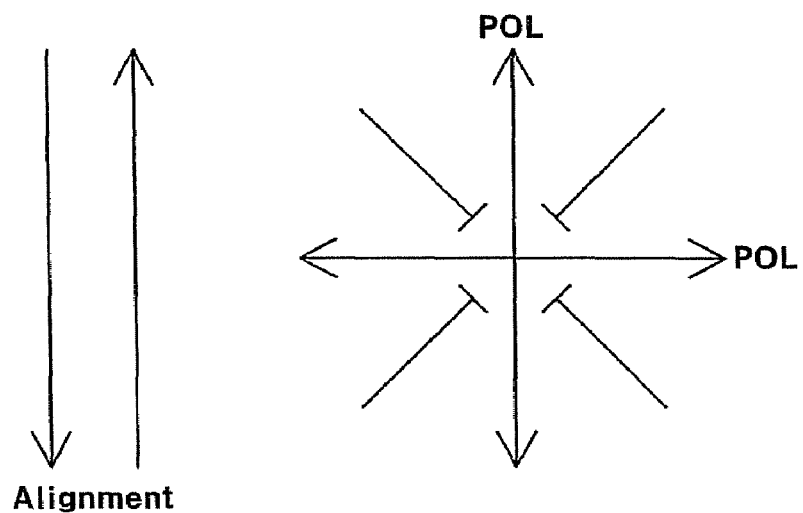
FIGS. 22 and 23 show two different types of pretilt directions for a pair of crossed polarization axes POL.
Figure 23:
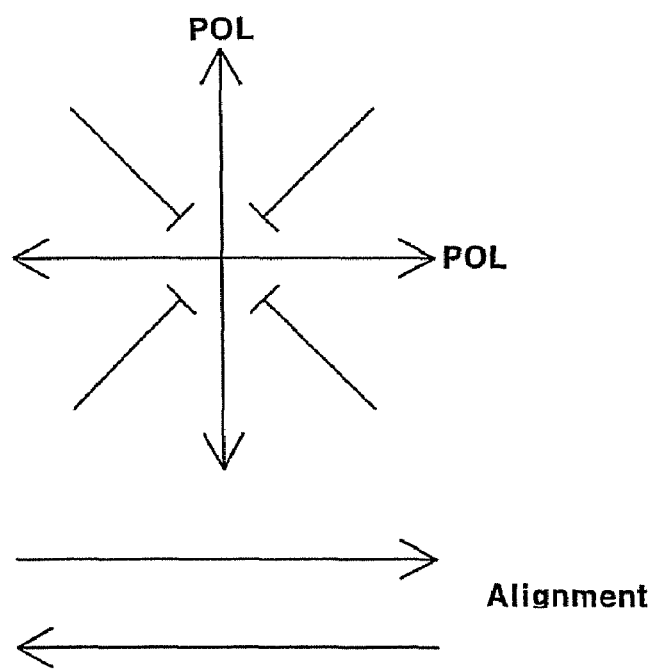

FIGS. 22 and 23 show two different types of pretilt directions, one in the longitudinal direction and the other in the transverse direction, for a pair of crossed polarization axes POL. The pretilt directions shown in FIGS. 22 and 23 are antiparallel to each other. The nails shown in FIGS. 22 and 23 indicate four different tilt directions of the LC molecules 31.

Accordingly, the orientations of the LC molecules 31 on each subarea enclosed by the cutouts 91-96 and 271-276 and chamfered edges of the pixel electrodes 190 have an azimuthal distribution made by balancing the aligning forces caused by the provision of the pretilt directions and caused by the cutouts 91-96 and 271-276, which improves lateral visibility as well as front visibility.

The pretilt treatment such as rubbing or the light illumination can be localized by using photoresist pattern. For example, the pretilt directions formed by the local pretilt treatment may be equal to the extending directions of the trenches 186 shown in FIG. 4.

Many of the above-described features of the LCD shown in FIGS. 1-5 may be appropriate to the LCD shown in FIGS. 18-21.

An LCD according to another embodiment of the present invention will be described in detail with reference to FIGS. 24-27.

Figure 24:
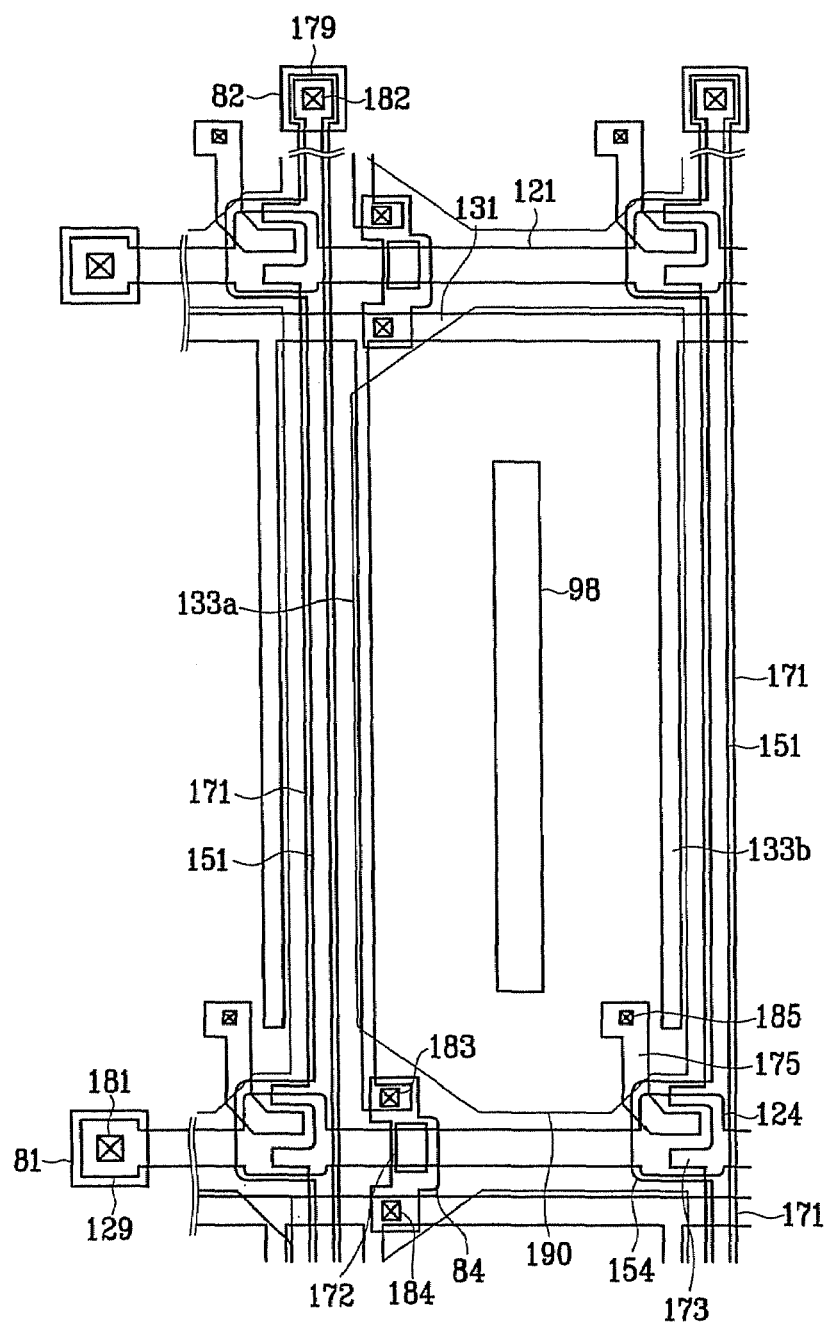
FIG. 24 is a layout view of a TFT array panel of an LCD according to an embodiment of the present invention.
Figure 25:
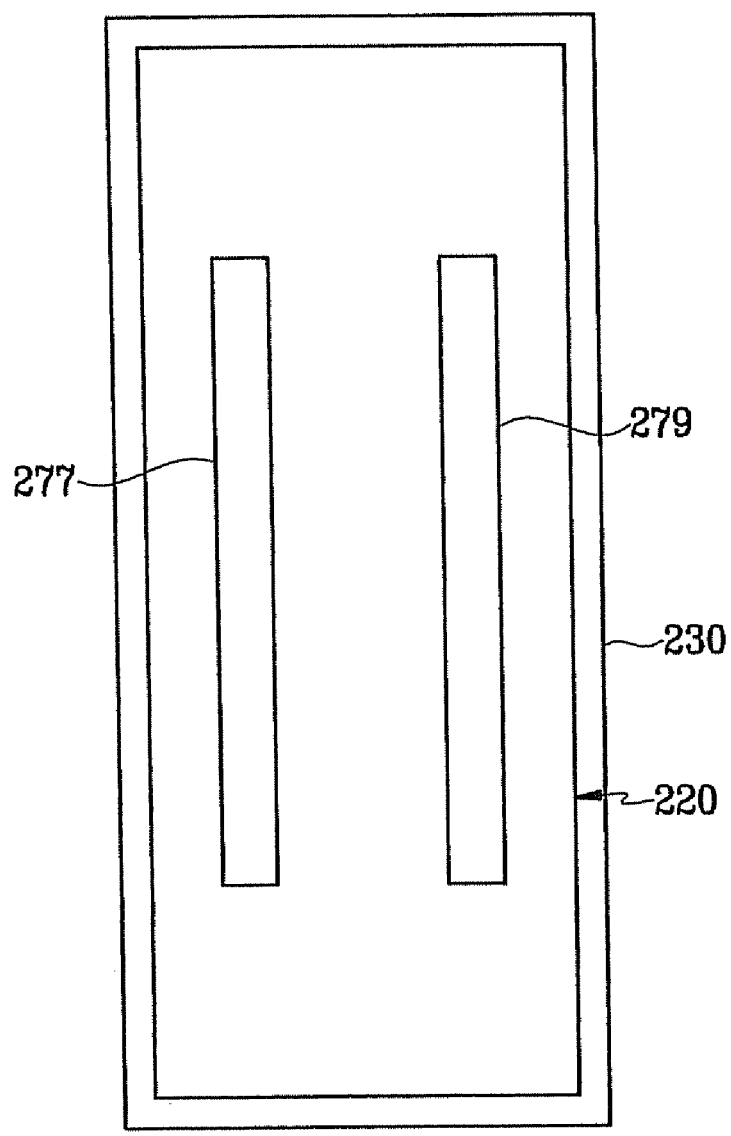
FIG. 25 is a layout view of a common electrode panel of an LCD according to an embodiment of the present invention.
Figure 26:
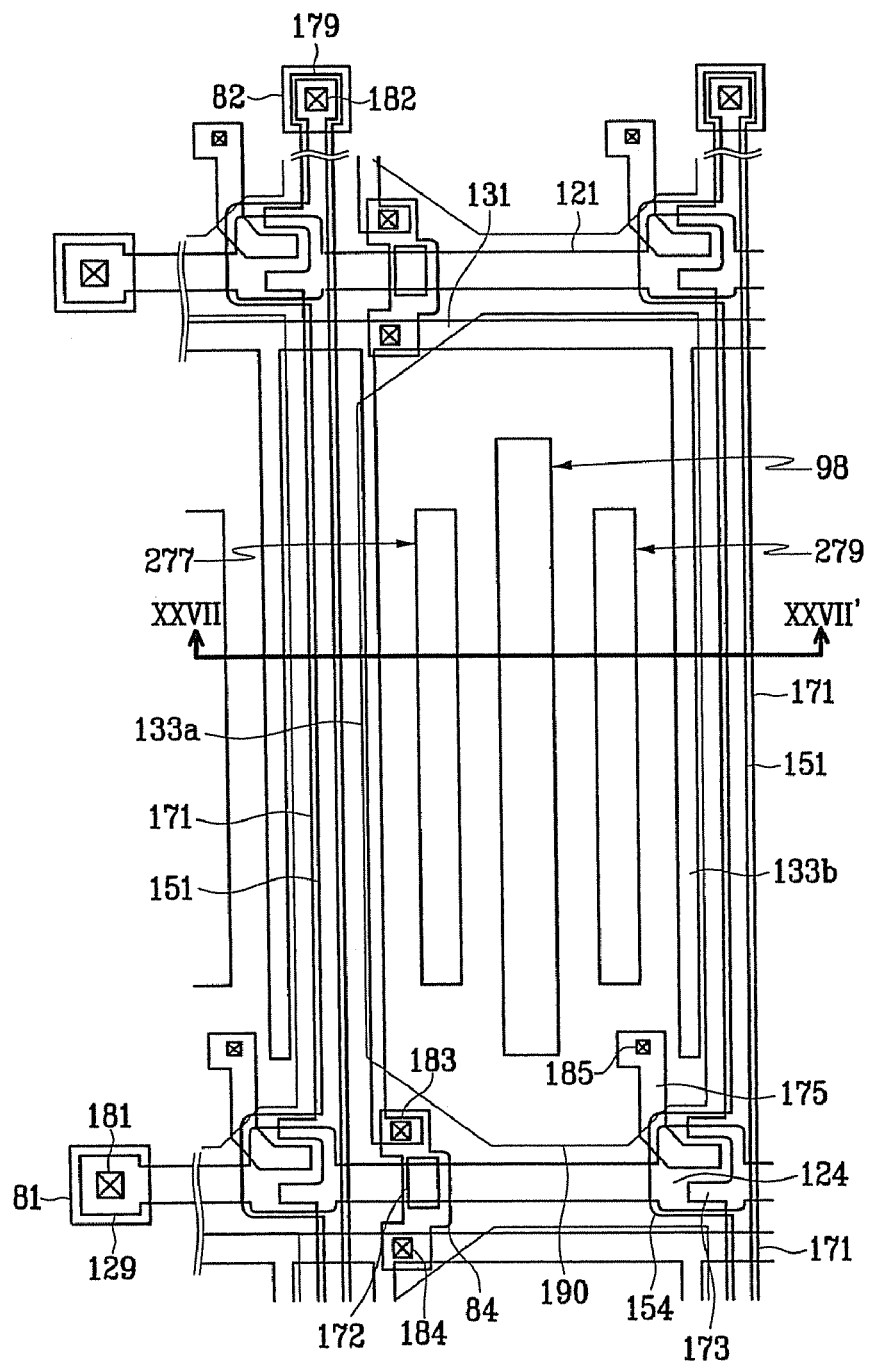
FIG. 26 is a layout view of an LCD including the TFT array panel shown in FIG. 24 and the common electrode panel shown in FIG. 25.
Figure 27:
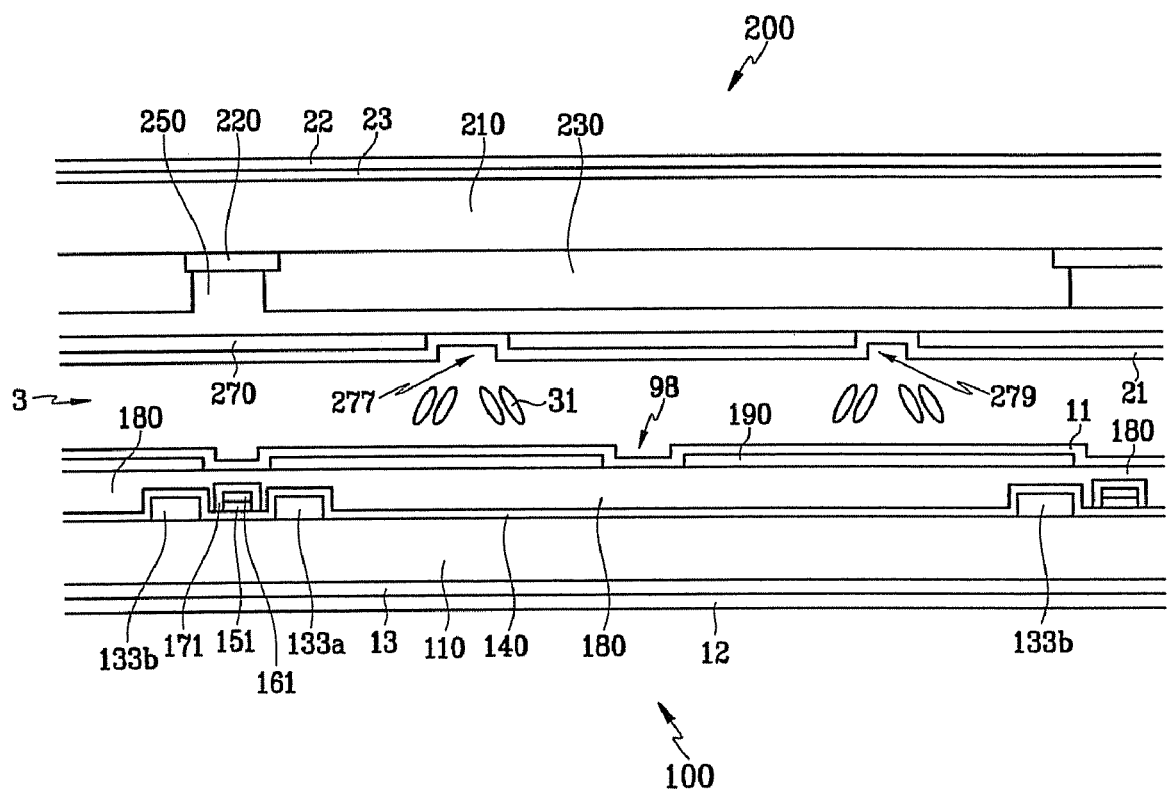
FIG. 27 is a sectional view of the LCD shown in FIG. 26 taken along the line XXVII-XXVII'.

FIG. 24 is a layout view of a TFT array panel of an LCD according to an embodiment of the present invention, FIG. 25 is a layout view of a common electrode panel of an LCD according to an embodiment of the present invention, FIG. 26 is a layout view of an LCD including the TFT array panel shown in FIG. 24 and the common electrode panel shown in FIG. 25, and FIG. 27 is a sectional view of the LCD shown in FIG. 26 taken along the line XXVII-XXVII'.

Referring to FIGS. 24-27, an LCD according to this embodiment also includes a TFT array panel 100, a common electrode panel 200, and a LC layer 3 interposed therebetween and including a number of LC molecules 31.

Layered structures of the panels 100 and 200 according to this embodiment are almost the same as those shown in FIGS. 18-21.

Regarding the TFT array panel 100, a plurality of gate lines 121 including a plurality of gate electrodes 124 and end portions 129 and a plurality of storage electrode lines 131 including a plurality of storage electrodes 133a and 133b are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and end portions 179, a plurality of drain electrodes 175, and a plurality of isolated metal pieces 172 are formed on the ohmic contacts 161 and 165, and a passivation layer 180 is formed thereon. A plurality of contact holes 181-185 are provided at the passivation layer 180 and the gate insulating layer 140. A plurality of pixel electrodes 190, a plurality of contact assistants 81 and 82, and a plurality of storage connections 84 are formed on the passivation layer 180, and an alignment layer 11 is coated thereon.

Regarding the common electrode panel 200, a light blocking member 220, a plurality of color filters 230, an overcoat 250, a common electrode 270, and an alignment layer 21 are formed on an insulating substrate 210.

Retardation films 13 and 23 for compensating the retardation of the LC layer 3 are disposed on outer surfaces of the panels 100 and 200, and crossed polarizers 12 and 22 are provided on the retardation films 13 and 23, respectively.

Different from the LCD shown in FIGS. 18-21, each pixel electrode 190 has a cutout 98 extending in a longitudinal direction and bisecting the pixel electrode 190 into left and right halves. In addition, the common electrode 270 has a plurality of pairs of cutouts 277 and 279 and each pair of cutouts 277 and 279 faces a pixel electrode 190 and is disposed between the cutout 98 of the pixel electrode 190 and longitudinal edges of the pixel electrode 190. The cutouts 98, 277 and 279 make an electric field generated by the electrodes 190 and 270 to have a horizontal component in a transverse direction.

Furthermore, the polarization axes of the polarizers 12 and 22 make an angle of about 45 degrees with the gate lines 121 and the data lines 171 and the alignment layers 11 and 21 are subject to pretilt treatment giving a pretilt direction parallel to one of the polarization axes POL of the polarizers 12 and 22.

Figure 28:
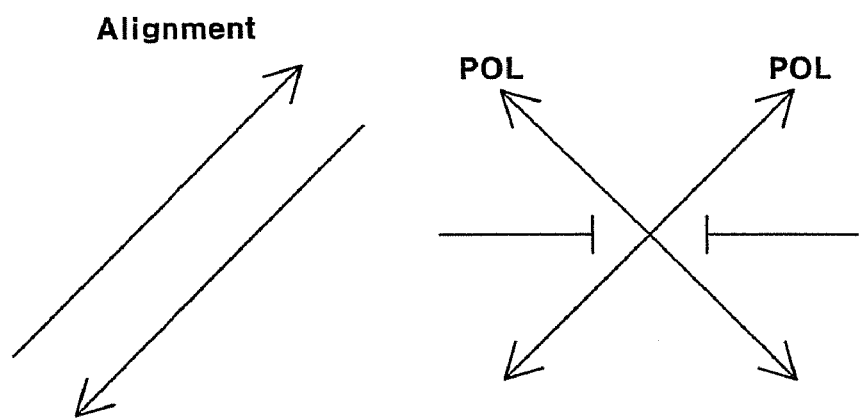
FIG. 28 show exemplary pretilt directions, tilt directions of the LC molecules, and a pair of crossed polarization axes POL of the LCD shown in FIGS. 24-27.

FIG. 28 show exemplary pretilt directions, the tilt directions of the LC molecules, and a pair of crossed polarization axes POL of the LCD shown in FIGS. 24-27. The pretilt directions shown in FIG. 28 are antiparallel to each other. The nails shown in FIGS. 22 and 23 indicate two different tilt directions of the LC molecules 31.

Figure 29:
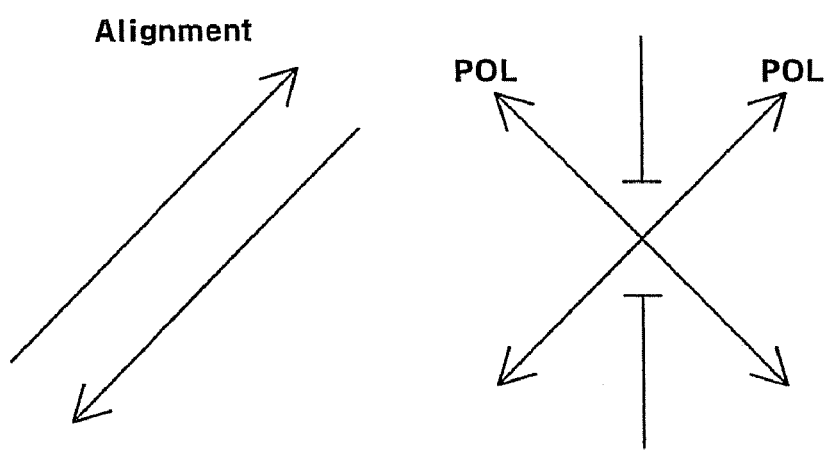
FIG. 29 shows exemplary pretilt directions, tilt directions of LC molecules, and a pair of crossed polarization axes POL of an LCD according to another embodiment of the present invention.

When the cutouts 98, 277 and 279 extend in the transverse direction, the tilt directions may be longitudinal as shown in FIG. 29, which shows pretilt directions, tilt directions of LC molecules, and a pair of crossed polarization axes POL of such an LCD.

Accordingly, the orientations of the LC molecules 31 on each subarea enclosed by the cutouts 98, 277 and 279 and the longitudinal edges of the pixel electrodes 190 have an azimuthal distribution made by balancing the aligning forces caused by the provision of the pretilt directions and caused by cutouts 98, 277 and 279, which improves lateral visibility as well as front visibility.

Many of the above-described features of the LCD shown in FIGS. 18-21 may be appropriate to the LCD shown in FIGS. 24-27.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display comprising:
    first and second panels facing each other, interposing a gap therebetween, and the first panel having a first field generating electrode and the second panel having a second field generating electrodes;
    a liquid crystal layer filled in the gap and including a plurality of liquid crystal molecules; an insulating layer disposed under the first field generating electrode;
    first and second tilt direction defining members disposed on the first and the second panels, respectively, and giving a first tilt direction to a group of the liquid crystal molecules; and
    a third tilt direction defining member disposed on one of the first and the second panels and giving a second tilt direction oblique to the first tilt direction to the plurality of liquid crystal molecules,
    wherein the third tilt direction defining member comprises a plurality of trenches formed at the insulating layer and disposed in the area defined by the first and the second tilt direction defining members.

2. The liquid crystal display of claim 1, wherein the second tilt direction makes an angle of about 40 to about 50 degrees with the first till direction.

3. The liquid crystal display of claim 2, wherein the second tilt direction makes an angle of about 45 degrees with the first tilt direction.

4. The liquid crystal display of claim 1, farther comprising a first polarizer disposed on the first panel and having a polarization axis substantially parallel to the second tilt direction.

5. The liquid crystal display of claim 4, wherein the third tilt direction defining member is disposed on the first panel.

6. The liquid crystal display of claim 5, further comprising a fourth tilt direction defining member disposed on the second panel and giving a third tilt direction opposite the second tilt direction to the plurality of the liquid crystal molecules.

7. The liquid crystal display of claim 4, further comprising a second polarizer disposed on the second panel and having a polarization axis substantially perpendicular to the polarization axis of the first polarizer.

8. The liquid crystal display of claim 7, wherein the liquid crystal molecules are vertically aligned.

9. The liquid crystal display of claim 8, wherein one of the first and the second panels further comprises:
    a thin film transistor connected to one of the first and the second field-generating electrodes; and
    a gate line and a data line connected to the thin film transistor.

10. The liquid crystal display of claim 1, wherein the first and the second tilt direction defining members extend parallel to each other to define an area having two major edges and the group of the liquid crystal molecules are disposed in the area defined by the first and the second tilt direction defining members.

11. The liquid crystal display of claim 10, wherein the first tilt direction defining member comprises one of at least one first cutout in the first field-generating electrode and at least one first protrusion on the first field-generating electrode, and the second tilt direction defining member comprises one of at least one second cutout in the second field-generating electrode and at least one second protrusion on the second field-generating electrode.

12. The liquid crystal display of claim 1, wherein the first panel further comprises:
    a thin film transistor connected to the first field-generating electrode; and
    a gate line and a data line connected to the thin film transistor.

13. The liquid crystal display of claim 12, wherein the area defined by the first and the second tilt direction defining members has a minor edge oblique to the major edges thereof and the trenches adjacent to the minor edge extend perpendicular to the minor edge.

14. The liquid crystal display of claim 13, further comprising a first polarizer disposed on the first panel and having a polarization axis substantially parallel to the second tilt direction.

15. The liquid crystal display of claim 14, further comprising a second polarizer disposed on the second panel and having a polarization axis substantially perpendicular to the polarization axis of the first polarizer.

16. The liquid crystal display of claim 15, wherein the liquid crystal molecules are vertically aligned.

17. A liquid crystal display comprising:
a first substrate having first and second surfaces;
a common electrode formed on the first surface of the first substrate;
a first tilt direction defining member formed on the first substrate and extending in a first direction;
a first alignment layer formed on the common electrode;
a first polarizer disposed on the second surface of the first substrate;
a second substrate having a first surface facing the first surface of the first substrate and a second surface;
a gate line formed on the first surface of the second substrate;
a gate insulating layer formed on the gate line;
a data line formed on the gate insulating layer;
a passivation layer formed on the data line;
a pixel electrode formed on the passivation layer;
a second tilt direction defining member formed on the second substrate and extending in the first direction;
second alignment layer formed on the pixel electrode;
a second polarizer disposed on the second surface of the second substrate; and
a liquid crystal layer disposed between the first alignment layer and the second alignment layer and including a plurality of liquid crystal molecules,
wherein the first tilt direction defining member includes one of at least one cutout in the common electrode and at least one protrusion on the common electrode, and the second tilt direction defining member includes one of at least one cutout in the pixel electrode and at least one protrusion on the pixel electrode,
wherein the passivation layer has one of a plurality of trenches extending in at least one extending direction oblique to the first direction disposed between the first tilt direction defining member and the second tilt direction defining member, and at least one of the first and the second alignment layers has experienced pretilt treatment giving at least one pretilt direction oblique to the first direction to the liquid crystal molecules, and
wherein the trenches near an edge of the pixel electrode extend perpendicular to the edge of the pixel electrode.

18. The liquid crystal display of claim 17, the at least one extending direction and the at least one pretilt direction make an angle of about 40 degrees to about 50 degrees.

19. The liquid crystal display of claim 17, wherein the at least one extending direction and the at least one pretilt direction make an angle of about 45 degrees.

20. The liquid crystal display of claim 17, wherein one of polarization axes of the first and the second polarizers is parallel to the at least one extending direction and the at least one pretilt direction.

21. The liquid crystal display of claim 17, wherein polarization axes of the first and the second polarizers are crossed.

22. The liquid crystal display of claim 21, wherein the liquid crystal molecules are vertically aligned.

23. The liquid crystal display of claim 17, wherein the pixel electrode has a plurality of depressions formed by the trenches.

24. The liquid crystal display of claim 17, wherein the second alignment layer has a plurality of depressions formed on depressions of the pixel electrode.

25. The liquid crystal display of claim 17, wherein the edge of the pixel electrode is parallel to the gate line or the data line.

26. The liquid crystal display of claim 17, wherein the pretilt treatment comprises at least one of rubbing and light illumination.

27. The liquid crystal display of claim 26, wherein both the first and the second alignment layer have experienced the pretilt treatment giving opposite pretilt directions.

* * * * *